US012617615B2

(12) United States Patent
Rietema et al.

(10) Patent No.: US 12,617,615 B2
(45) Date of Patent: May 5, 2026

(54) PALLET SORTING SYSTEM AND METHOD OF USE

(71) Applicant: KAMPS PALLETS INC., Grand Rapids, MI (US)

(72) Inventors: Bradley D. Rietema, Grand Rapids, MI (US); Brian Haas, Traverse City, MI (US); Kris A. Chayer, Hudsonville, MI (US); Michael R. Holmes, Hudsonville, MI (US); Adam Lee Winner, Grandville, MI (US)

(73) Assignee: Kamps Pallets Inc., Grand Rapids, MI (US)

( * ) Notice: Subject to any disclaimer, the term of this patent is extended or adjusted under 35 U.S.C. 154(b) by 0 days.

(21) Appl. No.: 19/269,318

(22) Filed: Jul. 15, 2025

(65) Prior Publication Data

US 2026/0021966 A1     Jan. 22, 2026

Related U.S. Application Data

(63) Continuation-in-part of application No. 18/934,570, filed on Nov. 1, 2024, which is a continuation-in-part of application No. 18/774,372, filed on Jul. 16, 2024.

(51) Int. Cl.
*B65G 1/137* (2006.01)
*B07C 5/342* (2006.01)

(52) U.S. Cl.
CPC ............ *B65G 1/1371* (2013.01); *B07C 5/342* (2013.01); *B65G 2203/041* (2013.01)

(58) Field of Classification Search
CPC .. B65G 1/1371; B65G 2203/041; B07C 5/342
See application file for complete search history.

(56) References Cited

U.S. PATENT DOCUMENTS

| | | | |
|---|---|---|---|
| 2,776,741 A | 1/1957 | Carrier, Jr. | |
| 2,895,624 A | 7/1959 | Oster, Jr. | |
| 3,007,585 A | 11/1961 | William | |
| 3,717,249 A | 2/1973 | Faley | |
| 3,912,254 A * | 10/1975 | Woodruff ................. | B07C 5/14 |
| | | | 271/189 |

(Continued)

FOREIGN PATENT DOCUMENTS

| | | |
|---|---|---|
| DE | 2823055 A1 | 11/1979 |
| JP | 07185475 A | 7/1995 |

(Continued)

OTHER PUBLICATIONS

Notification of Transmittal of the International Search Report and the Written Opinion of the International Searching Authority for Counterpart PCT/US2025/037719, Dated Oct. 21, 2205, 9 Pages.

*Primary Examiner* — Kyle O Logan
(74) *Attorney, Agent, or Firm* — McGarry Bair PC

(57) ABSTRACT

A method for conveying a pallet through a pallet sorting system that includes receiving a pallet at a first position. A first set of pallet data is sensed from first sensors, where the first set of pallet data is non-image data. A second set of pallet data is sensed by image sensors. A logic module receives the first set of pallet data and the second set of pallet data. A subset of pallet data is selectively communicated to a machine learning module, which determines a third set of pallet data. A conveyance path is determined based at least on the third set of pallet data.

19 Claims, 13 Drawing Sheets

(56) References Cited

U.S. PATENT DOCUMENTS

| 5,096,369 | A | 3/1992 | Ouellette |
| 5,190,162 | A | 3/1993 | Hartlepp |
| 5,421,446 | A | 6/1995 | Koch |
| 5,551,833 | A | 9/1996 | Marsh |
| 6,089,819 | A | 7/2000 | Barnes |
| 6,264,042 | B1 * | 7/2001 | Cossey, Jr. ............. B07C 5/362 |
| | | | 198/572 |
| 6,688,459 | B1 | 2/2004 | Bonham |
| 7,765,668 | B2 | 8/2010 | Townsend et al. |
| 7,958,624 | B2 | 6/2011 | Townsend et al. |
| 8,881,360 | B2 | 11/2014 | Townsend et al. |
| 8,918,976 | B2 | 12/2014 | Townsend et al. |
| 9,592,989 | B2 | 3/2017 | Herrmann |
| 10,092,987 | B2 | 10/2018 | Townsend et al. |
| 10,099,869 | B2 | 10/2018 | De Lama Arenales |
| 10,358,300 | B2 | 7/2019 | Rieu |
| 10,824,904 | B2 | 11/2020 | Souder et al. |
| 11,507,771 | B2 | 11/2022 | Souder et al. |
| 11,772,131 | B2 | 10/2023 | Suss |
| 11,851,293 | B2 | 12/2023 | Graston et al. |
| 11,969,760 | B1 * | 4/2024 | De La Rosa ............. B07C 5/16 |

| 2003/0038179 | A1 * | 2/2003 | Tsikos ................... H01S 5/4025 |
| | | | 235/454 |
| 2009/0134221 | A1 * | 5/2009 | Zhu ..................... G06K 7/10544 |
| | | | 235/462.14 |
| 2009/0169353 | A1 | 7/2009 | Townsend et al. |
| 2010/0082152 | A1 * | 4/2010 | Mishra ..................... H04N 7/18 |
| | | | 700/226 |
| 2016/0355349 | A1 * | 12/2016 | Chierego ............... B65G 43/08 |
| 2020/0238340 | A1 | 7/2020 | Bombaugh |
| 2023/0114085 | A1 * | 4/2023 | Soomro ............... G06V 10/764 |
| | | | 382/159 |
| 2023/0161351 | A1 | 5/2023 | Prasad et al. |
| 2023/0196187 | A1 * | 6/2023 | Horowitz ............... G06N 20/00 |
| | | | 706/12 |
| 2023/0211382 | A1 * | 7/2023 | Soomro ............... G06N 3/0464 |
| | | | 209/577 |
| 2024/0242171 | A1 * | 7/2024 | Sasaki ............... G06Q 10/0837 |

FOREIGN PATENT DOCUMENTS

| JP | 2007289892 | A | 11/2007 |
| JP | 2009042193 | A | 2/2009 |
| JP | 7487767 | B1 | 5/2024 |
| KR | 102367128 | B1 | 2/2022 |

\* cited by examiner

200

Determine sorting configuration ---201

Receive pallet ---202

Sense first set of pallet data ---204

Sense second set of pallet data ---206

Receive first and second sets of pallet data ---208

Normalize data ---209

Communicate subset of pallet data ---210

Determine third set of pallet data ---212

Communicate third set of pallet data ---214

Determine conveyance path ---216

Communicate conveyance path ---218

Transport pallet ---220

PALLET SORTING SYSTEM AND METHOD OF USE

CROSS REFERENCE TO RELATED APPLICATION(S)

This application is a continuation-in-part of patent application Ser. No. 18/934,570, filed Nov. 1, 2024, now U.S. Pat. No. 12,530,658, issued Jan. 20, 2026, which is a continuation-in-part of U.S. patent application Ser. No. 18/774,372, filed Jul. 16, 2024, all of which are incorporated herein by reference in their entirety.

TECHNICAL FIELD

The present subject matter relates generally to a method for conveying a pallet through a pallet sorting system that includes at least a conveyor system.

BACKGROUND

Pallets are used to move and ship materials or products. The wooden pallet is the most commonly used shipping pallet and can be made from a variety of woods, including oak or pine. Pallets can also be made of, for example, plastic, metal, paper, recycled materials, or combination thereof. Pallets provide an inexpensive and relatively durable platform to transport materials or products.

DETAILED DESCRIPTION

Figure 1:
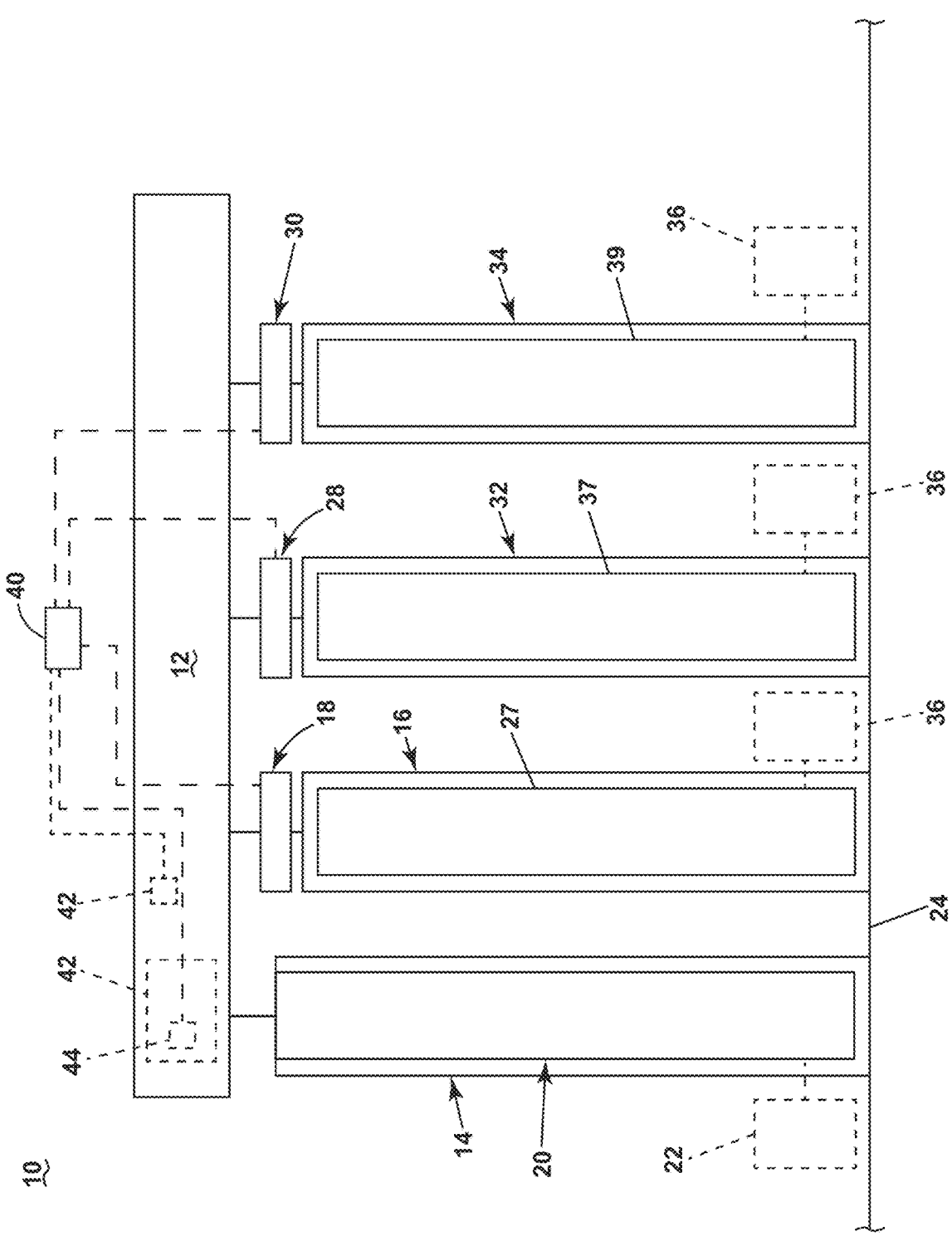
FIG. 1 is a schematic view of a pallet sorting system in accordance with various aspects described herein.

Pallets are often reusable and can be repairable. Prior to initial use, before repair, before reuse or any combination thereof, pallets can be graded or sorted. A pallet can be graded or sorted based on one or more physical properties of the pallet such as by way of non-limiting example, cleanliness, integrity of the boards, position of the nails relative to the surface of the boards of the pallet, finishing applied, or any combination thereof. The pallet grade or sorting assignment can be one or more of a letter, a number, or a symbol indicating a classification that is met. The classifications are split up using predetermined physical property thresholds.

Pallets can be further sorted based on pallet condition. Optionally, pallet condition can be specific to the type or origin of a pallet or pallet materials. For example, the condition of a plastic pallet can include a surface area analysis looking for one or more holes and comparing the dimensions of the one or more holes to a series of predetermined thresholds. Plastic pallets often include holes on the loading surface, so the origin or type of pallet can determine what series of predetermined thresholds should be applied. Alternatively, wooden pallet condition can be based on board color (e.g., color data), condition, location, or fastener presence or location (e.g., nails or clasps located in appropriate location).

Aspects of the disclosure as described herein are directed to a system and method of sorting pallets. The pallet sorting system includes at least a conveyance system and a loading assembly. Such a conveyance system can include a conveyor system but can include any other suitable system for moving pallets. A pallet can be received at a first position of the conveyance system or the loading assembly. At the first position or prior to the first position, a first set of pallet data can be collected from a first sensor, a second set of pallet data can be collected by a second sensor, or a combination thereof. The first set of pallet data and the second set of pallet data are received or otherwise communicated to a logic module either directly to the logic module or communicated to the logic module via, for example, a controller module. The first set of pallet data is different than the second set of pallet data.

The logic module selects at least one subset of pallet data based on the first set of pallet data and the second set of pallet data that is communicated to a machine learning module. For example, the logic module can select data directly from the first set of pallet data, the second set of pallet data, or a combination thereof to form the subset of pallet data. In another example, the logic module can process data from the first set of pallet data, the second set of pallet data, or a combination thereof and select from the processed data. By way of further example, the logic module can receive the first set of pallet data and the second set of pallet data and determine the subset of pallet data, which can include select data directly from the first set of pallet data, the second set of pallet data, or a combination thereof process and select from the first set of pallet data or the second set of pallet data, or any combination thereof.

The machine learning module uses the subset of pallet data to determine a third set of pallet data, which is different than the first set of pallet data, the second set of pallet data, and the subset of pallet data. The third set of pallet data is communicated from the machine learning module to the logic module. The logic module uses the third set of pallet data to determine a conveyance path for the pallet. The conveyance path is communicated from the logic module to the controller module which then transports the pallet along the conveyance path to a second position via the loading assembly or the conveyance system.

In a further non-limiting example, one or more sets of image data can be collected from any number of cameras. In one non-limiting example, such one or more sets of image data can define the first and second set of pallet data and the first and second sensor can include cameras. Alternatively, the one or more sets of image data can define a set of image data and that set of image date can be obtained from one or more cameras. The set of image data is received by the logic module, which communicates a subset of the set of image data to the machine learning module. The machine learning module then returns a set of learned data based on the set of image data. The set of learned data is received by the logic module, which then determines the conveyance path.

Among other things, the pallet sorting system can receive a pallet and transport the pallet via the determined conveyance path. The pallet is received at a loading assembly in communication with the controller module. The loading assembly includes a lifting mechanism or elevator that receives the pallet and lifts the pallet upward to an overhead conveyor system. The lifting mechanism or elevator can be powered by one or more motors or small engines. The overhead conveyer system, in communication with the controller module, uses a finger of a push rail to move the pallet from the loading assembly to a conveyor platform of the overhead conveyer system. A release assembly coupled to a portion of the conveyor platform can include movable or rotatable surfaces that define a portion of the conveyor platform when in a first position and provide an opening in the conveyor platform when in the second position. If opened, the release assembly provides a path for the pallet to enter a stacking assembly. The opening of one or more portions of the release assembly is based on the determined conveyance path of the pallet and is communicated by the controller module to the release assembly.

The stacking assembly includes a movable floor with a height adjustment mechanism. When the movable floor receives the pallet, the height adjustment mechanism can lower the movable floor so that another pallet can be placed on top of the pallet previously received. In a non-limiting example, the pallet sorting system includes multiple release assemblies that each correspond to one of multiple stacking assemblies. Thus, the multiple release assemblies couple the conveyor platform to a corresponding stacking assembly, where each stacking assembly can receive multiple pallets due to the adjustment downward of the movable floor.

As may be used herein, the terms "first," "second," or "third" may be used interchangeably to distinguish one component from another and are not intended to signify location or importance of the individual components.

All directional references (e.g., upper, lower, left, right, front, back, top, bottom, above, below, vertical, horizontal, upstream, downstream, forward, aft, etc.) are only used for identification purposes to aid the reader's understanding of the present disclosure, and do not necessarily create limitations, particularly as to the position, orientation, or use of aspects of the disclosure described herein. Directional references in the figures are given with reference to a floor on which at least a portion of the pallet sorting system rests.

Connection references (e.g., attached, coupled, and connected) are to be construed broadly and can include intermediate structural elements between a collection of elements and relative movement between elements unless otherwise indicated. As such, connection references do not necessarily infer that two elements are directly connected and in fixed relation to one another. The exemplary drawings are for purposes of illustration only. The dimensions, positions, order, and relative sizes reflected in the drawings attached hereto can vary.

The singular forms "a", "an", and "the" include plural references unless the context clearly dictates otherwise. Furthermore, as used herein, the term "set" or a "set" of elements can be any number of elements, including only one.

Uses of "and" and "or" are to be construed broadly. For example, and without limitation, uses of "and" do not necessarily require all elements or features listed, and uses of "or" are inclusive unless such a construction would be illogical.

The term "parallel" refers to generally parallel, where first and second lines extend such that a third line can be drawn that crosses the first and second lines, wherein the third line is in a range of 80 degrees to 100 degrees to both the first line and the second line.

As used herein, a "controller" or "module" can include a component configured or adapted to provide instruction, control, operation, or any form of communication for operable components to effect the operation thereof. A module or controller module can include any known processor, microcontroller, or logic device, including, but not limited to: field programmable gate arrays (FPGA), an application specific integrated circuit (ASIC), a proportional controller (P), a proportional integral controller (PI), a proportional derivative controller (PD), a proportional integral derivative controller (PID controller), a hardware-accelerated logic module (e.g. for encoding, decoding, transcoding, etc.), the like, or a combination thereof. Non-limiting examples of a controller module can be configured or adapted to run, operate, or otherwise execute program code to effect operational or functional outcomes, including carrying out various methods, functionality, processing tasks, calculations, comparisons, sensing or measuring of values, or the like, to enable or achieve the technical operations or operations described herein. The operation or functional outcomes can be based on one or more inputs, stored data values, sensed or measured values, true or false indications, or the like. While "program code" is described, non-limiting examples of operable or executable instruction sets can include routines, programs, objects, components, data structures, algorithms, etc., that have the technical effect of performing particular tasks or implement particular abstract data types. In another non-limiting example, a controller module can also include a data storage component accessible by the processor, including memory, whether transient, volatile or non-transient, or non-volatile memory. Additional non-limiting examples of the memory can include Random Access Memory (RAM), Read-Only Memory (ROM), flash memory, or one or more different types of portable electronic memory, such as discs, DVDs, CD-ROMs, flash drives, universal serial bus (USB) drives, the like, or any suitable combination of these types of memory. In one example, the program code can be stored within the memory in a machine-readable format accessible by the processor. Additionally, the memory can store various data, data types, sensed or measured data values, inputs, generated or processed data, or the like, accessible by the processor in providing instruction, control, or operation to effect a functional or operable outcome, as described herein.

Additionally, as used herein, elements being "in communication" can be mechanically or electrically coupled. Furthermore, such electrical connections or couplings can include a wired or wireless connection, or a combination thereof.

As used herein, while sensors can be described as "sensing" or "measuring" a respective value, sensing or measuring can include determining a value indicative of or related to the respective value, rather than directly sensing or measuring the value itself. The sensed or measured values can further be provided to additional components. For instance, the value can be provided to a controller module or processor as defined above, and the controller module or processor can perform processing on the value to determine a representative value or an electrical characteristic representative of said value.

As used herein, "image data" is data obtained from one or more cameras that records or captures light reflected from an object that is within the field of view of the camera. Image data is a two-dimensional data set based on intensity of reflected light from an object. The image data from a camera creates a complex visual representation of light and color.

As used herein, "non-image data" includes data from systems, sensors, etc. that are not cameras, such as, but not limited to, a laser sensor or a photoelectric sensor. The laser sensor can emit a laser pulse which strikes the object and reflects in multiple directions. Part of the laser pulse is received by an optical sensor and translated into an electrical signal based on the portion of the laser pulse that reaches the optical sensor and the time it takes for the laser pulse or portion of the laser pulse to reach the optical sensor. Similar to the laser sensor, photoelectric sensors can output an electrical signal based. However, the electrical signal from the photoelectric sensor is based on changing light intensities and is typically used as an "on/off" switch that indicates whether light was received at a detector/receiver or not.

As used herein, the term "machine learning" refers to the simulation of intelligent human behavior in computers, or the capability of a computer-based machine to learn and imitate intelligent human behavior, particularly in the making of intelligent decisions.

A machine learning module (or artificial intelligence AI) can effectively "learn" human behavior by providing at least a set of training data that includes training inputs and training outputs. The machine learning module learns patterns via the training inputs and associates such training inputs with corresponding training outputs, updating and developing an appropriate algorithm or set of algorithms.

Optionally, during a training process, other data, e.g., a set of validation data including validation inputs and validation outputs, is used to validate the training of the algorithm(s) of the machine learning module with respect to data that was not used for the original training. Further, after the training process is complete, still other data, e.g., a set of test data that includes both test inputs and test outputs, can be used to obtain an unbiased evaluation of the accuracy of the machine learning module.

FIG. 1 schematically illustrates a pallet sorting system 10 according to a non-limiting example. The pallet sorting system 10 can include, among other things, an overhead conveyor system 12, a loading assembly 14 that can provide one or more pallets to the overhead conveyor system 12, a stacking assembly, illustrated by way of example as a first stacking assembly 16 located below the overhead conveyor system 12, and a release assembly, illustrated by way of example as a first release assembly 18, which is coupled to a portion of the overhead conveyor system 12. The first release assembly 18 is configured to selectively release a pallet from the overhead conveyor system 12 into the first stacking assembly 16. The first stacking assembly 16 includes a first movable floor 27. When the first release assembly 18 selectively releases the pallet, the first movable floor 27 is located such that the pallet is supported by the first movable floor 27.

The loading assembly 14 includes a lifting mechanism illustrated as an elevator 20, by way of non-limiting example. Optionally, a feeder 22 can provide one or more pallets to the elevator 20 which lifts the one or more pallets upward to the overhead conveyor system 12. In other words, the elevator 20 can receive a pallet from the feeder 22. In a non-limiting example, the feeder 22 is illustrated as a loading conveyer belt. The elevator 20 can lift the pallet from the feeder 22 to increase the distance between the pallet and a floor 24. While illustrated as spaced from the floor 24, it is contemplated that one or more portions of the feeder 22 can be proximate, adjacent, or in contact with the floor 24.

The overhead conveyor system 12 receives the one or more pallets from the elevator 20 of the loading assembly 14. The overhead conveyor system 12 can include supports that suspend the overhead conveyor system 12 from a ceiling, support the overhead conveyor system 12 from the floor 24, or any combination thereof.

Multiple release assemblies illustrated as the first release assembly 18, a second release assembly 28, and a third release assembly 30 can be included in the pallet sorting system 10 by way of non-limiting example. The pallet sorting system 10 can also include multiple stacking assemblies illustrated as the first stacking assembly 16, a second stacking assembly 32, and a third stacking assembly 34. While illustrated as three, any number of release assemblies and corresponding stacking assemblies are contemplated. Further still, while a corresponding number of release assemblies and stacking assemblies is illustrated this is by non-limiting example and need not be the case. However, for illustrative purposes it will be understood that the second release assembly 28 can be configured to selectively release a pallet from the overhead conveyor system 12 into the second stacking assembly 32 and the third release assembly 30 can selectively release a pallet from the overhead from the overhead conveyor system 12 into the third stacking assembly 34. The second stacking assembly 32 includes a second movable floor 37. When the second release assembly 28 selects to release the pallet, the pallet is supported by the second movable floor 37. The third stacking assembly 34 includes a third movable floor 39. When the third release assembly 30 selects to release the pallet, the pallet is supported by the third movable floor 39.

It is contemplated that each of the first stacking assembly 16, the second stacking assembly 32, the third stacking assembly 34, or any combination thereof can include an unloading mechanism 36. The unloading mechanism 36 can be in communication with the first stacking assembly 16, the second stacking assembly 32, the third stacking assembly 34, or any combination thereof such that when a number of pallets within the first stacking assembly 16, the second stacking assembly 32, the third stacking assembly 34, or any combination thereof reaches a predetermined threshold or a predetermined time the pallet(s) are removed from the corresponding assembly. The unloading mechanism 36 by way of non-limiting example can be another conveyor belt. Such a conveyor belt can be a number of distinct belts, a movable system between stacking assemblies, or any conveyor system capable of receiving a stack of pallets from one or more of the first stacking assembly 16, the second stacking assembly 32, or the third stacking assembly 34. The unloading mechanism 36 could alternatively be a robotic mechanism configured to remove the pallet(s) from the corresponding assembly.

Figure 3:
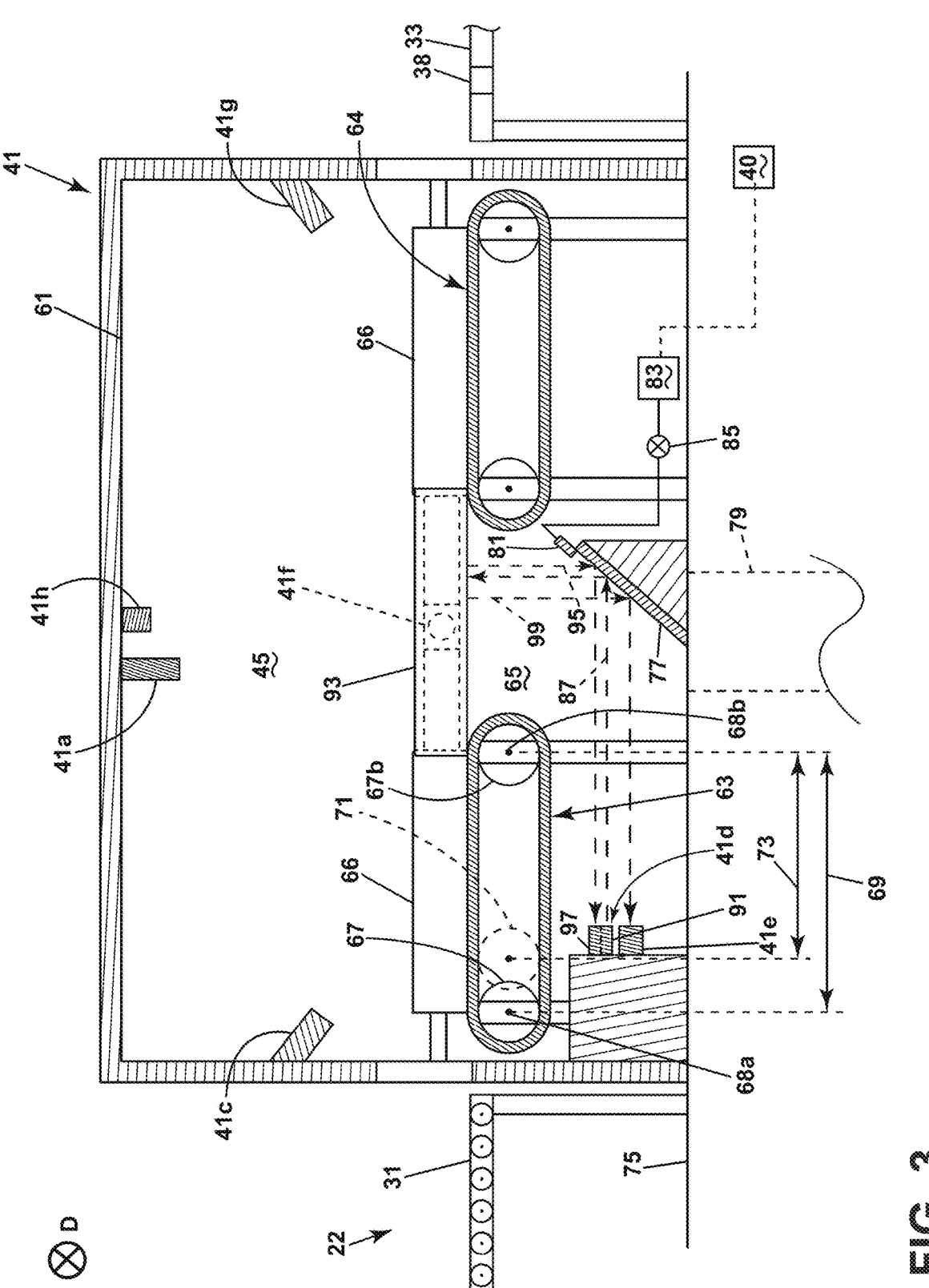
FIG. 3 is a schematic cross section view of a portion of the feeder, further illustrating a tunnel scanner assembly of FIG. 2 in accordance with various aspects described herein.

A control system 40 is in communication the pallet sorting system 10. As illustrated, by way of example, the control system 40 can be in communication with the first release assembly 18, the second release assembly 28, and the third release assembly 30. That is, the control system 40 controls which of the first release assembly 18, the second release assembly 28, or the third release assembly 30 is activated when a pallet is being conveyed through the pallet sorting system 10 based on a conveying path. The control system 40 can be in communication with other aspects of the pallet sorting system 10 such as, but limited to, one or more components of the overhead conveyor system 12, the loading assembly 14, the first stacking assembly 16, the elevator 20, the feeder 22, the first movable floor 27, the second stacking assembly 32, the third stacking assembly 34, the unloading mechanism 36, the second movable floor 37, third movable floor 39, or a compressed air source 83 (FIG. 3).

Input can be provided to the control system 40 by a user. Additionally, or alternatively, the control system 40 can be in communication with at least one sensor, illustrated by way of example as a first sensor 42 and a second sensor 44.

The first sensor 42 is illustrated, by way of example, as located at the overhead conveyor system 12. However, it is contemplated that the first sensor 42 can be located at the feeder 22, the loading assembly 14, or another portion of the pallet sorting system 10. The first sensor 42 can obtain information corresponding to at least one physical property of at least a portion of a pallet. By way of non-limiting example, the first sensor 42 can provide an output indicative of a length or a width of the pallet. While illustrated as a single sensor, the first sensor 42 can be any number of sensors in communication with the control system 40 located at one or more portions of the pallet sorting system 10. The first sensor 42 can be, by way of non-limiting example, a photoelectric sensor, a limit switch, a dimensional sensor, an encoder, or LiDAR sensor. Additionally, or alternatively, the first sensor 42 can be a user having, for example, a push button actuated by the user.

The second sensor 44 is spaced from the first sensor 42. The second sensor 44 is illustrated, by way of example, as located at the overhead conveyor system 12. However, it is contemplated that the second sensor 44 can be located at the feeder 22, the loading assembly 14, or another portion of the pallet sorting system 10. The second sensor 44 can be multiple sensors that include at least one optical sensor such as a camera or other sensor that provides visual data related to the pallet. That is, the second sensor 44 can provide image data regarding one or more portions of the pallet to the control system 40. While illustrated as a single sensor, the second sensor 44 can be any number of sensors in communication with the control system 40 located at one or more portions of the pallet sorting system 10. The second sensor 44 can be, by way of non-limiting example, a tunnel scanner equipped with multiple cameras and at least one additional system or sensor that provides non-image data. That is, the at least one additional system or sensor is not a camera.

Figure 2:
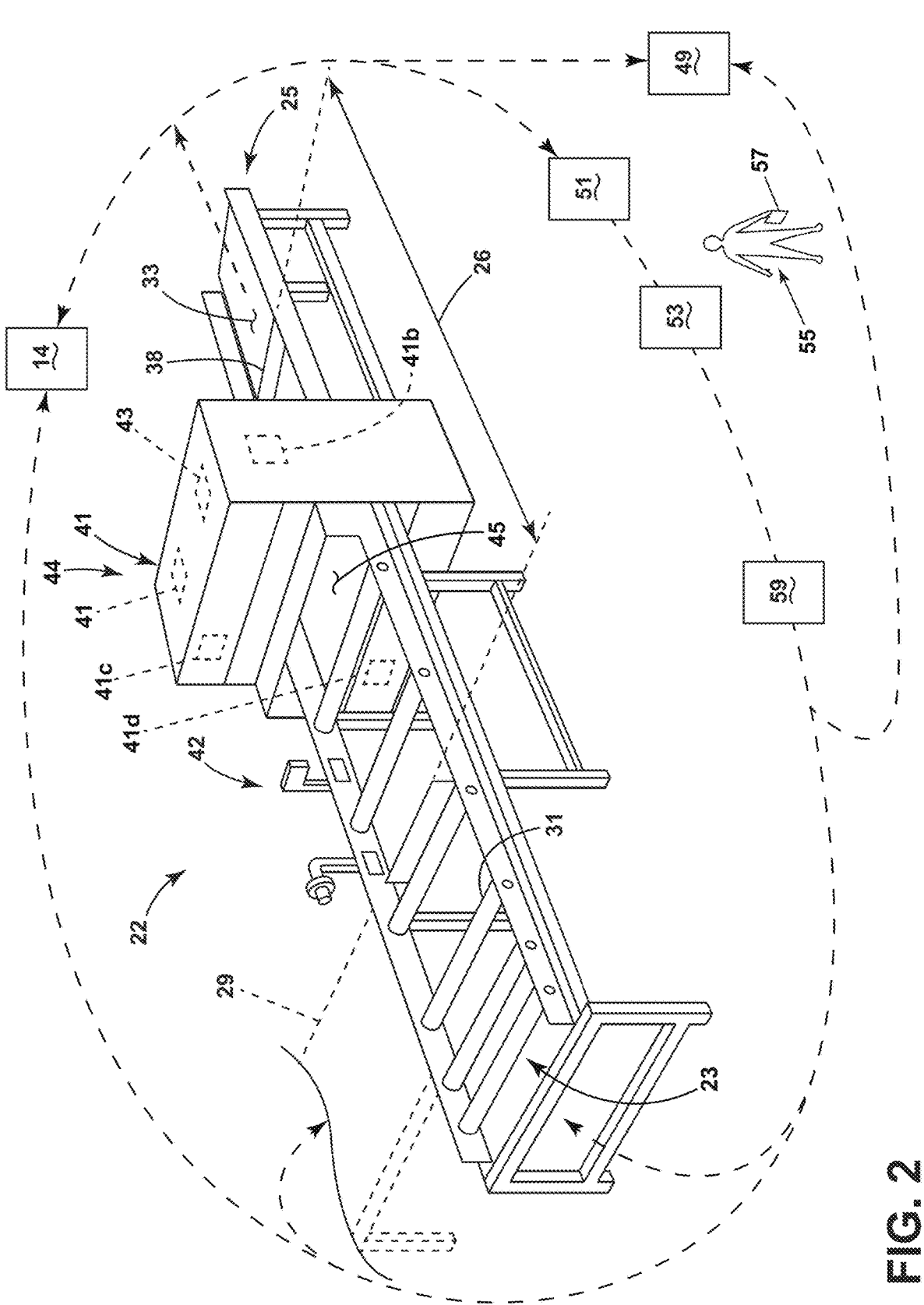
FIG. 2 is a perspective view of a feeder for use in the pallet sorting system of FIG. 1 in accordance with various aspects described herein.

FIG. 2 depicts a perspective view of the feeder 22 that can be utilized in the pallet sorting system 10 (FIG. 1). The feeder 22 is illustrated, by way of example, as having a receiving portion 23 and a delivery portion 25, where the delivery portion 25 can be in communication with the loading assembly 14. That is, a pallet can be received at the receiving portion 23 and transported to the delivery portion 25 for communication with the loading assembly 14. The pallets provided to the delivery portion 25 can be manually placed on the feeder 22, placed on the feeder 22 by another machine (e.g., forklift), or provided to the receiving portion 23 of the feeder 22 by another conveyor system.

Between the receiving portion 23 and the delivery portion 25 can be a first position 26. The first position 26 can include at least one sensor illustrated as the first sensor 42 having a plurality of first sensors, and the second sensor 44, illustrated as a tunnel scanner assembly 41 equipped with multiple cameras 41*a*, 41*b*, 41*c*. While the multiple cameras 41*a*, 41*b*, 41*c* are illustrated as three cameras, any number of cameras are contemplated.

The tunnel scanner assembly 41 can further include at least another system or sensor illustrated as a sensor 41*d* that provides non-image data. In other words, the tunnel scanner assembly 41 can include sensors, which are not cameras (illustrated as the sensor 41*d*). While the sensor 41*d* is illustrated as a single sensor, it is contemplated that the tunnel scanner assembly 41 can include any number of non-camera sensors. It is further contemplated that the non-camera sensors can have additional detectors or components located anywhere within or adjacent the tunnel scanner assembly 41. By way of non-limiting example, the sensor 41*d* can be a laser sensor or a photelectric sensor. The laser sensor can be, for example, a laser profiler capable of providing an electric output indicative of, for example, one or more of dimensional data, profile data, shape data, geometry data, or object topography data. The laser sensor can provide one or more of dimensional data, object profile, object shape, object geometry, or object topography for the pallet while the pallet is in motion.

The tunnel scanner assembly 41 includes a tunnel 45 through which the pallet travels. The tunnel 45 houses a plurality of sensors illustrated as the multiple cameras 41*a*, 41*b*, 41*c* and the sensor 41*d*. In other words, the tunnel scanner assembly 41 can include any number of cameras or other optical sensors for gathering at least image data related to the pallet. The tunnel scanner assembly 41 can also include any number of sensors capable of providing non-image data related to the pallet. The tunnel scanner assembly 41 can obtain the optical and non-optical data while the pallet is in motion through the tunnel scanner assembly 41.

Exemplary sensors in the form of imaging devices may include any optical sensor capable of capturing still or moving images, such as a camera. One suitable type of camera is a CMOS camera. Other exemplary imaging devices include a CCD camera, a digital camera, a video camera or any other type of device capable of capturing an image. That camera may capture either or both visible and non-visible radiation. For example, the camera may capture an image using visible light. In another example, the camera may capture an image using non-visible light, such as ultraviolet light. In yet another example, the camera may be a thermal imaging device capable of detecting radiation in the infrared region of the electromagnetic spectrum. The imaging device may be located anywhere within the tunnel 45 including numerous locations depending on the particular structure of the tunnel 45 and the desired position for obtaining an image. This can further includer at the entrance, exit, or a combination thereof. There may also be multiple imaging devices, which may image the same or different areas of the tunnel.

Exemplary sensors in the form of non-imaging sensors may include any sensor capable of obtaining non-image data related to the pallet. For example, the non-imaging sensor can be a laser profiler that uses an emitted signal, typically a laser pulse or beam to scan an object's surface and measure, detect, or otherwise estimate the object's profile. The laser profiler can use laser triangulation which involves projecting a laser line or array onto the object and capturing the reflected light with an optical sensor. The optical sensor provides data (as electrical signals) that may be processed to create a 2D or 3D profile or topography of the object. Data from multiple laser profilers can be combined to obtain 2D or 3D profile or topography of the object from more than one direction (e.g., a top and a bottom). The signal from one or more laser profilers can be overlapped to provide one or more of additional precision, redundancy, or additional detail of another surface adjacent to the surface generally perpendicular to the sensor.

The pallet sorting system 10 including the tunnel 45 may also have an illumination source 43. The type of illumination source may vary. Including an incandescent light or one or more LED lights located within the tunnel 45 including at the entrance, exit, or a combination thereof. It is also within the scope of the invention for the pallet sorting system 10 to have more than one illumination source. The illumination source 43 may be located adjacent the imaging device (e.g., multiple cameras 41a, 41b, 41c) or located on a different side of the tunnel 45. When the illumination source is located on the same side of the tunnel 45 as the imaging device, the imaging device may detect the light that may be reflected by the interior of the tunnel 45 and the pallet. Image analysis may then be used to separate the tunnel 45 and the pallet. When the illumination source 43 is located on opposite side, the imaging device may detect only the light from the illumination source 43 that is not blocked by the pallet. At any instant in time, a given location in an image will be dark or light depending on whether or not a portion of the pallet is present at that location. The illumination generated by the illumination source 43 may vary, and may well be dependent on the type of imaging device. For example, illumination may be infrared if the imaging device is configured to image in the infrared spectrum. Similarly, the illumination may be visible light, if the imaging device is configured to image the visible spectrum.

Optionally, the feeder 22 can have one or more intersecting paths illustrated as side conveyor 29. The side conveyor 29 can receive a pallet as an alternative path. By way of non-limiting example, one or more additional sensors or a user can select the alternative path which transports the pallet to the side conveyor 29 instead of the delivery portion 25.

The feeder 22 is illustrated, by way of example as having multiple rollers 31, a feeder belt 33, and push rails 38, but any known conveyor feeder is contemplated. The feeder 22 is illustrated as having a single side conveyer 29, however any number of converging conveyors or paths are contemplated.

In operation, the pallet can be received at the feeder 22 via the receiving portion 23 or the side conveyor 29. The pallet moves to the first position 26 via the rollers 31, the push rails 38, or a combination thereof. Between the receiving portion 23 or the side conveyor 29, the pallet can pass the first sensor 42. The first sensor can collect a first set of non-image data. The non-image data can be related to a physical aspect (e.g., dimension or weight). Further, the non-image data from the first sensor 42 can be a digital signal indicative of motion such as a position of the pallet, a velocity of the pallet, a direction of motion, or any combination thereof. That is, the first sensor 42 can be an encoder capable of communicating to the controller module 150, the logic module 152, the logic module 152 via the controller module 150, the digital signal indicative of the motion of pallet. Information from the first sensor 42 can be used to activate other sensors, such as one or more sensors within the tunnel canner assembly 41. Optionally, the first sensor 42 is not required.

As the pallet then enters the tunnel 45 of the tunnel scanner assembly 41 from the rollers 31, the sensor 41d within the tunnel 45 can obtain non-image data corresponding to the pallet. The non-image data of the sensor 41d can be a second set of pallet data. If the first sensor 42 is omitted, the non-image data of the sensor 41d can be a first set of pallet data.

The multiple cameras 41a, 41b, 41c obtain image data corresponding to the pallet. The image data obtained by the multiple cameras 41a, 41b, 41c can be a third set of pallet data. If the first sensor 42 is omitted, the image data obtained by the multiple cameras 41a, 41b, 41c can be a second set of pallet data.

The first set of pallet data, second set of pallet data, third set of pallet data, or any combination thereof can be used to determine a conveyance path for the pallet. The conveyance path can include a maintenance loop. That is, the first set of pallet data, second set of pallet data, third set of pallet data, or any combination thereof can be used to determine whether the pallet requires maintenance, disposal, or is ready to enter the loading assembly 14. The first set of pallet data, second set of pallet data, third set of pallet data, or any combination thereof can be used to determine at least one of a conveyance path or a maintenance list for the pallet that is to be conveyed through the maintenance loop. The maintenance list can indicate whether the pallet needs repair or is ready to be received by the loading assembly 14. If the maintenance list indicates that the pallet is ready to be sorted, the pallet exits the tunnel 45 and can be transported via the feeder belt 33, the push rails 38, or a combination thereof to the loading assembly 14. Alternatively, if the determined conveyance path or the maintenance list indicates the pallet is damaged beyond repair, the pallet exits the tunnel 45 and can be transported via the feeder belt 33, the push rails 38, or a combination thereof, to a refuse area 49. The maintenance list can indicate one or more of a nail pop at or beyond a predetermined threshold, crack or chip in one or more stringer or block that is equal to or larger than a predetermined threshold, split block equal to or larger than a predetermined threshold, block dimensions equal to or larger than a predetermined threshold, overhang of a deck board from a stringer or block equal to or larger than a predetermined threshold, separation of a deck board or base board from a stringer or block equal to or larger than a predetermined threshold overhang of a block beyond the deck boards or away from the stringer equal to or larger than a predetermined threshold, separation of any two boards at a joint, crack or chip in one or more deck boards that is equal to or larger than a predetermined threshold, spacing of the deck boards that is less than or equal to a predetermined threshold or equal to or larger than a predetermined threshold, missing components (e.g., block, deck board, stringer, fasteners), or contamination or discoloration.

Alternatively, if the determined conveyance path or the maintenance list indicates the pallet requires repair (e.g., within the maintenance loop), the pallet exits the tunnel 45 and can be transported via the feeder belt 33, the push rails 38, or a combination thereof, to any number of repair stations illustrated as a first repair station 51 and a second repair station 53. While illustrated as being in series, it is contemplated that the first repair station 51 and the second repair station 53 can be in parallel. That is, the pallet can arrive at only one of the first repair station 51 or the second repair station 53. The maintenance list can provide an output to a user 55 via a screen 57 indicating what repairs need to be performed for the pallet. This can be considered a work order for the user. The screen 57 is illustrated as a wireless handheld device. It is contemplated that the screen 57 can alternatively be wired. It is also contemplated that the screen 57 can be included in a permanent work station. The screen 57 can by way of further non-limiting example include multiple screens. For example, the first repair station 51 and the second repair station 53 can each have any number of their own screens. Further, the user 55 can be multiple users each having their own screen 57.

After passing through the first repair station 51, the second repair station 53, or a combination thereof, the pallet can enter another tunnel scanner assembly 59 or re-enter the same tunnel scanner assembly 41. In the non-limiting example where there is the another tunnel scanner assembly 59, the another tunnel scanner assembly 59 can be similar to the tunnel scanner assembly 41. Alternatively, the another tunnel scanner assembly 59 can include different combinations of sensors than the tunnel scanner assembly 41. Post repair data is collected by the sensors of the another tunnel scanner assembly 59 (or the re-entered tunnel scanner assembly 41). The post repair data obtained, in a non-limiting example, is used to determine if the pallet has a conveyance path to the receiving portion 23, the side conveyor 29, the loading assembly 14, the refuse area 49, or returned to the maintenance loop with a maintenance list.

The conveyor system can include any number of additional sensors (e.g., a third set of sensors) that can collect data indicative of motion of a pallet (e.g., position, change in position, velocity, direction of motion, or any combination thereof). That is, the additional sensors can, for example, encoders or LiDAR sensors capable of communicating to the controller module 150, the logic module 152, or the logic module 152 via the controller module 150, a signal indicative of the motion of pallet. Information from the additional sensors can be used to activate other sensors, control the speed at which pallets are loaded or control other aspects (e.g., vertical belt system 52 (FIG. 5), conveyor platform 80 (FIG. 6), friction brake assembly 111 (FIG. 8)) of the conveyor system.

FIG. 3 depicts a cross-sectional schematic view of the tunnel scanner assembly 41 having a housing 61. The tunnel scanner assembly 41 includes the cameras 41a, 41b (FIG. 2), 41c. The tunnel scanner assembly 41, by way of non-limiting example, can further include additional cameras 41e, 41f, 41g. The cameras 41a, 41b (FIG. 2), 41c, the additional cameras 41c, 41f, 41g, or any combination thereof can be mounted to the housing 61 within the tunnel 45.

A first belt, illustrated as a seamless belt 63, and a second belt, illustrated as a second seamless belt 64 can be at least partially located in the tunnel 45. As used herein, the term "seamless belt" is a belt that is adhered, woven, spliced, melted, molded, or the like resulting in a continuous loop. That is, the seamless belt does not require a mechanical fastener. Seamless belts often improve durability and performance of a conveyance system. In contrast to a seamless belt is a non-seamless belt that can be, for example, a zipper belt using mechanical fasteners (e.g., clips, plates, hinges, any mechanical fastener) to form a continuous loop. Mechanical fasteners often result in a bump, ridge, or other protrusion which can impede conveyance of the pallet.

The second seamless belt 64 is spaced from the first seamless belt 63. A gap 65 is defined between the first seamless belt 63 and the second seamless belt 64. Guide rails 66 can be located on either side of the first seamless belt 63 and/or the second seamless belt 64.

The first seamless belt 63 can be horizontally located to receive the pallet (not shown) from the rollers 31. The second seamless belt 64 can be located such that the pallet can transition from the first seamless belt 63 to the second seamless belt 64. The second seamless belt 64 can be located such that the pallet can transition from the second seamless belt 64 to the push rails 38 and/or the feeder belt 33. It is also contemplated that the pallet can transition from the second seamless belt 64 to another set of rollers.

The first seamless belt 63 wraps around at least a first roller 67a having a first axis of rotation 68a and a second roller 67b having a second axis of rotation 68b. An operating length 69 can be measured between the first axis of rotation 68a and the second axis of rotation 68b when the first seamless belt 63 is taunt or operable. The first roller 67a can move toward the second roller 67b, illustrated by phantom lines 71. A released length 73, less than the operating length 69, can be measured between the first axis of rotation 68a and the second axis of rotation 68b when the first seamless belt 63 is loose and the first roller 67a is moved towards the second roller 67b as illustrated by the phantom lines 71. While illustrated as the first roller 67a shifting towards the second roller 67b, it is contemplated that the first roller 67a can be fixed and the second roller 67b can move towards the first roller 67a to define the released length 73 less than the operating length 69. While illustrated as moving parallel to the floor 75, it is contemplated that the first roller 67a can shift vertically and horizontally with respect to the floor 75.

While illustrated as generally parallel to a surface illustrated as a floor 75, it is contemplated that any portion of the feeder 22, the first seamless belt 63, the second seamless belt 64, the feeder belt 33 or any combination thereof, can be angled with respect to the floor 75.

The sensor 41d can be located between the first seamless belt 63 and the floor 75. The sensor 41d can mount to a portion of the housing 61 or a portion of the feeder 22.

A mirror 77 is located at or above the floor 75 and below the first seamless belt 63 and the second seamless belt 64. While illustrated at the floor 75 and below the first seamless belt 63 and the second seamless belt 64, it is contemplated that at least a portion of the mirror 77 is located between the first seamless belt 63 and the second seamless belt 64, spatially below the first seamless belt 63 and the second seamless belt 64, or a combination thereof. In other words, the mirror 77 can be located at least partially located in the gap 65 between the first seamless belt 63 and the second seamless belt 64. The sensor 41d can be positioned to emit a signal (e.g., laser pulse) that strikes the mirror 77. The mirror 77 can be positioned at a predetermined angle relative to the floor. The predetermined angle can send the signal emitted from the sensor 41d to through the gap 65 between the first seamless belt 63 and the second seamless belt 64 to detect or obtain information about the pallet as it moves from the first seamless belt 63 to the second seamless belt 64.

For example, the sensor 41d can emit an electromagnetic signal 87 (e.g., pulse or continuous wave) from an emission portion 91 of the sensor 41d. The emitted electromagnetic signal 87 is reflected by the mirror 77 to the pallet 93. The pallet 93 reflects at least a portion of the emitted electromagnetic signal 87 as an at least partially reflected electromagnetic signal 95 which can contact the mirror 77 and be received a detecting portion 97 of the sensor 41d or by other receivers or detecting devices within the tunnel scanner assembly 41.

The mirror 77 provides a significant benefit as the sensor 41d is required to be a predetermined distance from the pallet as it transitions from the first seamless belt 63 to the second seamless belt 64. The predetermined distance of the sensor 41d from the pallet can be used in calculations of, for example, topography. The predetermined distance also ensures a spreading of the signal emitted from the sensor 41d to predetermined dimensions, as further illustrated in FIG. 4.

Traditionally, in order to properly place the sensor 41d at the predetermined distance, a hole 79, illustrated, by way of example, as dotted lines, would need to be dug into, beyond, or below the floor 75. The mirror 77 allows for mounting of the sensor 41d without the need of the hole 79. This provides one or more benefits of cost, time of installation, safety, mobility of tunnel scanner assembly and associated feeder, improved quality and/or quality of non-image data, or maintains floor structural integrity.

As disclosed, the distance from the sensor 41d to the mirror 77 plus the distance from the mirror 77 to the pallet 93 (as traveled by the emitted electromagnetic signal 87) is equal to the predetermined distance the sensor 41d is required to be from the pallet 93 to ensure calibration of the detected signal and spreading of the emitted signal.

A clearing device 81 can be located within the tunnel scanner assembly 41. By way of non-limiting example, the cleaning device 81 can be provided on or adjacent the mirror 77. The clearing device 81 selectively fluidly couples to the compressed air source 83 via a conduit and at least one valve 85. The clearing device 81 can include, by way of non-limiting example, a knife blower. The knife blower can provide compressed air to a surface of the mirror 77 to clear the mirror 77 of dust, debris, or the like. While illustrated as using compressed air, the clearing device 81 can be an automated device that wipes, sprays, or can otherwise clear dust, debris, or the like from the mirror 77. The control system 40 can be in communication with one or more components of the clearing device 81. As illustrated, by way of example, the control system 40 can be in communication with the compressed air source 83. Additionally, or alternatively, one or more portions or aspects of the clearing device 81 can be in communication with any number of controllers. The control system 40 can provide communication to the clearing device 81 as to how often the clearing device 81 should be activated. For example, the frequency of the activation of the clearing device 81 can be a predetermined frequency that is time based (e.g., once every 30 minutes, 2 hours, 4 hours, 8 hours, or the like). Alternatively, the frequency of the activation of the clearing device 81 can be numerically based (e.g., once every 50 pallets, 100 pallets, 200 pallets, or the like). It is contemplated that the frequency of the activation of the clearing device 81 can be increased or decreased, for example, by the user 55 (FIG. 2). Alternatively, or additionally the control system 40 can receive feedback or instruction from a sensor that activates the clearing device 81. That is, a sensor can determine if the mirror 77 is unclean and provide an output received by the control system 40 that activates the clearing device 81. In one non-limiting example, it is contemplated that the image data and/or the non-image data can be utilized to determine if the mirror 77 should be cleaned. Additionally, the mirror 77 can be cleaned or otherwise cleared by a user. For example, the clearing device 81 can be used while the pallet sorting system 10 is in a cycle of operation, while between cycles of operation the user can clean, clear, or replace the mirror 77 or a portion of the mirror 77 (e.g., remove a protective film).

An upper sensor 41h can be located above the gap 65. The upper sensor 41h can be a non-optical sensor similar to the sensor 41d. The output from the upper sensor 41h can be combined with the output of the sensor 41d to provide a 3D topography of the pallet. While illustrated as single sensors, the upper sensor 41h, the lower sensor 41d, or both can be any number of sensors. By way of non-limiting example, the sensor 41d and/or the upper sensor 41h can be two sensors spaced in direction (D) that is a direction that is into/out of the page.

One or more receivers can be mounted in the tunnel 45. The one or more receivers can detect at least a portion of the emitted signal from, for example, the sensor 41d, the upper sensor 41h, or a combination thereof. The receiver can be part of the sensor 41d and/or the upper sensor 41h or located at another location within the housing 61.

The camera 41e can be positioned to obtain image data via the mirror 77. This can provide the benefit of image data of the bottom of the pallet as the pallet passes over the gap 65. This provides the benefit of obtaining image data of the bottom of the pallet to improve accuracy of the sorting while not having to position the camera directly below the pallet in the gap 65. Dust and debris can accumulate on the mirror 77, which is easily cleared by the clearing device 81, rather than accumulating on a camera lens located in the gap 65 directly below the pallet. The camera or camera lens can be harder to clear and can be less durable than the mirror 77. Therefore, the mirror 77 provides additional benefits of durability and visibility to obtain optical data.

The camera 41e can receive light that is reflected from the pallet 93, illustrated as reflected light 99. The reflected light 99 can reflect or otherwise change direction via the mirror 77 to be received by the camera 41e.

While the mirror 77 is illustrated as a single mirror, any number of mirrors are contemplated. For example, the sensor 41d and the camera 41e can have separate or spaced mirrors. By way of further example, one or more first mirrors can correspond to the sensor 41d and one or more second mirrors spaced from or coupled to one or more of the first mirrors can correspond to the camera 41e.

Figure 4:
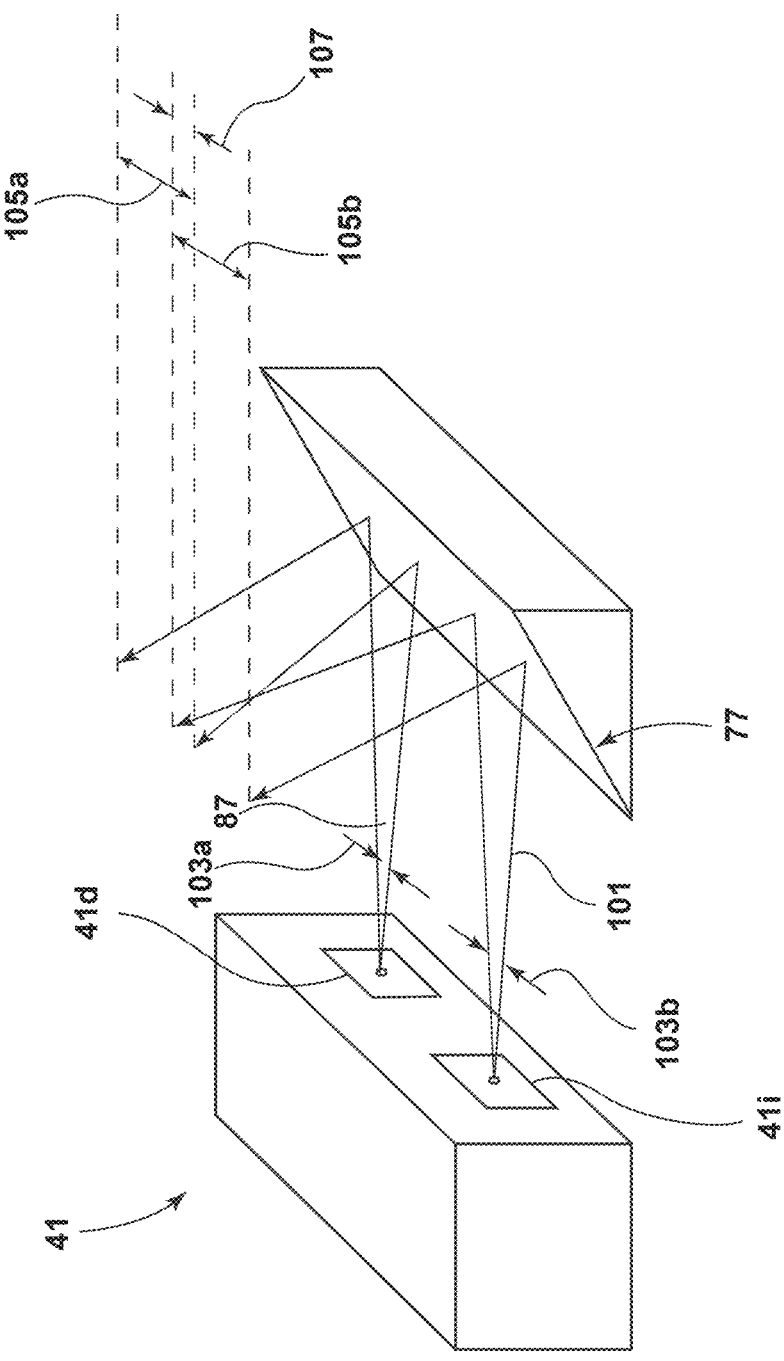
FIG. 4 is a perspective view of a portion of the tunnel scanner assembly of FIG. 3 in accordance with various aspects described herein.

FIG. 4 is a perspective view of a portion of the tunnel scanner assembly 41. The tunnel scanner assembly 41 can include the sensor 41d below the first seamless belt 63 (FIG. 3) as well as another non-image data sensor 41i. The sensor 41d emits the emitted electromagnetic signal 87 and the another non-image data sensor 41i can provide or emit an emitted electromagnetic signal 101. The emitted electromagnetic signals 87, 101 can have a respective width or first field of vision 103a, 103b measured as the width of the emitted electromagnetic signals 87, 101 at a location between the sensor 41d or the another non-image data sensor 41i and a reflective surface of the mirror 77. As illustrated, by way of example, the first field of vision 103a, 103b increases as the emitted electromagnetic signals 87, 101 travels from the sensor 41d and the another non-image data sensor 41i to the mirror 77.

The emitted electromagnetic signals 87, 101 have a respective second field of vision 105a, 105b measured after the emitted electromagnetic signals 87, 101 has reflected from the mirror 77. The second field of vision 105a, 105b can be measured in the same plane as a bottom or lower portion of the pallet 93 (FIG. 3).

The second field of vision 105a, 105b, as illustrated by way of example, can continue to increase or widen as the emitted electromagnetic signals 87, 101 travels away from the mirror 77. One or more portions of the second field of vision 105a, 105b can overlap to define an overlapping region 107. That is, a portion of the emitted electromagnetic signals 87 from the sensor 41d and a portion of the emitted electromagnetic signals 101 from the sensor 41i can overlap to define the overlapping region 107. The overlapping region 107 can be used to stitch or otherwise combine the data from the sensor 41d to the data from the sensor 41i to obtain at least a portion of the first set of non-image data or second set of non-image data for the pallet 93 (FIG. 3).

Figure 5:
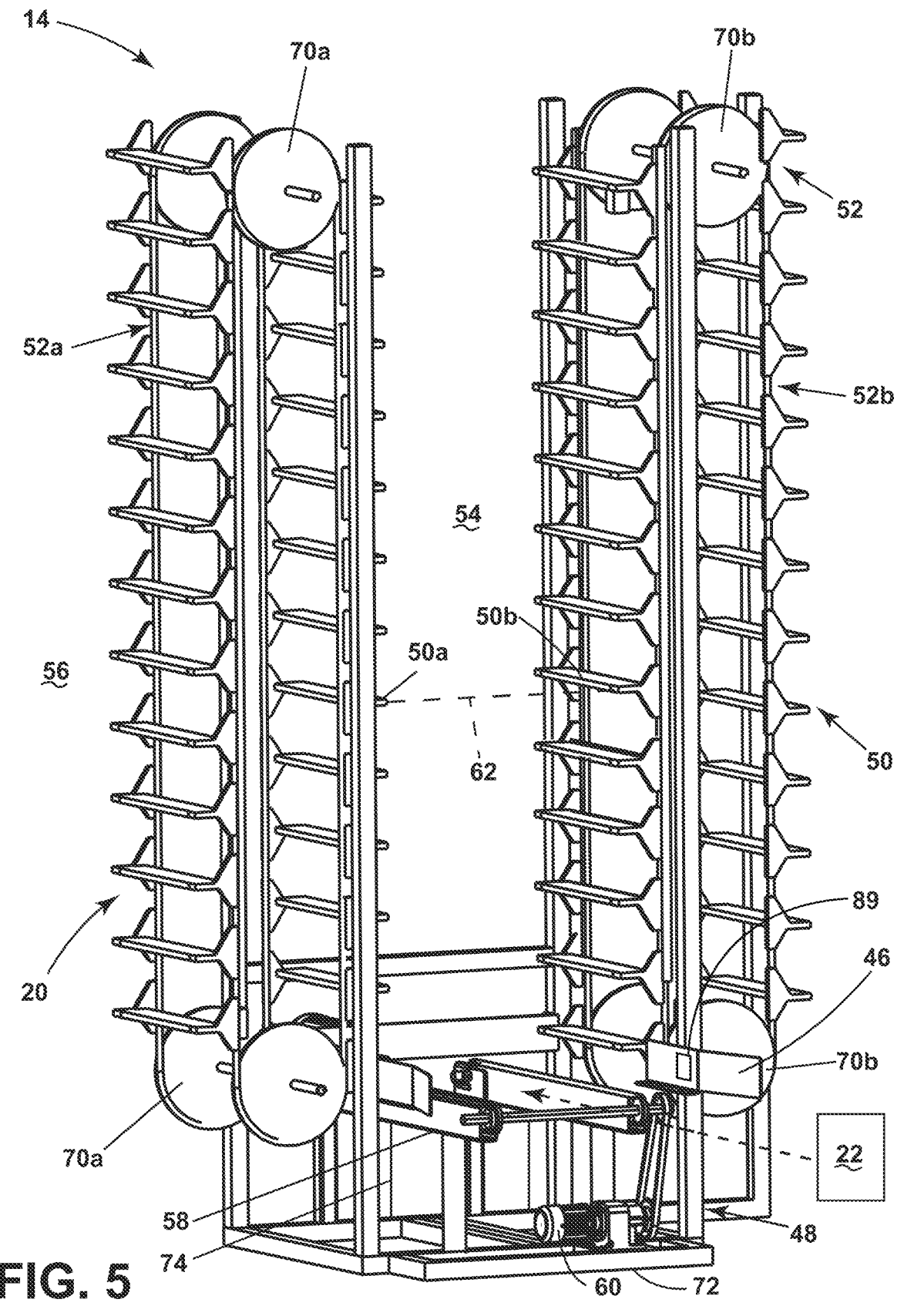
FIG. 5 is a perspective view of a loading assembly for use in the pallet sorting system of FIG. 1 in accordance with various aspects described herein.

FIG. 5 depicts a perspective view of the loading assembly 14 that can be utilized in the pallet sorting system 10 (FIG. 1). The loading assembly 14 includes a support frame 48 and the elevator 20 illustrated, by way of example, as a plurality of slats 50 coupled to a vertical belt system 52. While described as a having a belt, the vertical belt system 52 can include, instead of a belt or in addition to a belt, a chain or other notched device capable of being driven including being driven by a wheel or a gear.

The support frame 48 defines an interior 54 of the loading assembly 14 and an exterior 56 of the loading assembly 14. It is contemplated that the support frame 48 can include additional beams or structures. It is further contemplated that the support frame 48 can include legs, adjustable legs, or other structural aspects.

Loading belts 58 located in the interior 54 of the loading assembly 14 can be driven by a first motor 60. Optionally, the feeder 22 can align or couple to the loading belts 58. It is contemplated that the feeder belt 33 (FIG. 2) can align with the loading belts 58 such that a pallet provided by the feeder 22 can be pulled into the interior 54 by the loading belts 58. Additionally, or alternatively, the push rails 38 (FIG. 2) can provide the pallet from the feeder 22 to the loading belts 58.

Guide plates 46 can couple to the support frame 48. The guide plates 46 are located adjacent the loading belts 58 and can help align the pallet on the loading belts 58.

A loading sensor 89 can be located at the guide plates 46. Alternatively, the loading sensor 89 can be coupled to the frame 48. The loading sensor 89 is at the inlet or opening of the loading assembly 14. The loading sensor 89 provides a signal indicative of the presence of at least a portion of the pallet that is not within the interior 54 of the loading assembly 14. If the pallet has not completely entered the loading assembly 14, the loading sensor 89 will prevent the lifting or motion of the plurality of slats 50.

The loading sensor 89 can be, for example, an array of light provided by a source via, for example, fiber optics. The array spans at least 4 inches. For example, the loading sensor 89 can be an array of light having a span that is at least six inches. The span of the array allows for the pallet to be detected even when a portion of the array passes through holes or gaps in the pallet.

The plurality of slats 50 include at least one pair of slats including a first slat 50a and a second slat 50b located in the same horizontal plane. That is, a horizontal line, illustrated as dotted line 62, can be drawn between symmetric portions of the pair of slats including the first slat 50a and the second slat 50b. In other words, when a pallet is received at the interior 54 by the pair of slats including the first slat 50a and the second slat 50b, the pallet sits level on the pair of slates including the first slat 50a and the second slat 50b.

The vertical belt system 52 includes a first belt system 52a, a first set of gears or wheels 70a, a second belt system 52b, and a second set of gears or wheels 70b. The first belt system 52a moves a first slat 50a about the first set of gears or wheels 70a, which rotate in a counterclockwise direction, when looking from the front or the feeder 22. When the first slat 50a is located in the interior 54, the first belt system 52a lifts or increases the distance the first slat 50a is from a base 72 of the support frame 48. When the first slat 50a rotates about a top portion of the first belt system 52a to the exterior 56, the first belt system 52a lowers or decreases the distance the first slat 50a is from the base 72 of the support frame 48. Similarly, the second belt system 52b moves a second slat 50b about gears or wheels 70b, which rotate in a clockwise direction, when looking from the front or the feeder 22. When the second slat 50b is located in the interior 54, the second belt system 52b lifts or increases the distance the second slat 50b is from the base 72 of the support frame 48. When the second slat 50b rotates about a top portion of the second belt system 52b to the exterior 56, the second belt system 52b lowers or decreases the distance the second slat 50b is from the base 72 of the support frame 48.

A second motor 74 can drive both the first belt system 52a and the second belt system 52b. The second motor 74 is coupled to the first belt system 52a and the second belt system 52b such that the horizontal line, illustrated as the dotted line 62, will always connect the pair of slats including the first slat 50a and the second slat 50b.

The first motor 60 and the second motor 74 can be controlled or in communication with at least one or more portions of the control system 40 (FIG. 1). While illustrated as having the first motor 60 and the second motor 74, the loading assembly 14 can include any number of motors, including a single motor.

It is further contemplated that the elevator 20 is not limited by the example provided and can include any automated or manual means, such that, when a pallet is received by the elevator 20 at the interior 54 and lifted to the overhead conveyor system 12 (FIG. 1).

Optionally, the first sensor 42 can obtain information corresponding to at least one physical property of at least a portion of a pallet or information corresponding to the motion of the pallet when the pallet is located at the feeder 22, at the interior 54 of the loading assembly 14, or any combination thereof. That is, the first portion, which is defined by a location in which one or more sensors obtains pallet data, can be located at the feeder, the loading assembly 14, or a combination thereof. The first sensor 42 or a sensor of multiple first sensors can be coupled to one or more portions of the feeder 22, the support frame 48, the elevator, or any combination thereof.

Optionally, second sensor 44 can obtain image data corresponding to the pallet when the pallet is located at the feeder 22, at the interior 54 of the loading assembly 14, or any combination thereof. The second sensor 44 or a sensor of multiple second sensors can be coupled to one or more portions of the feeder 22, the support frame 48, the elevator, or any combination thereof.

Figure 6:
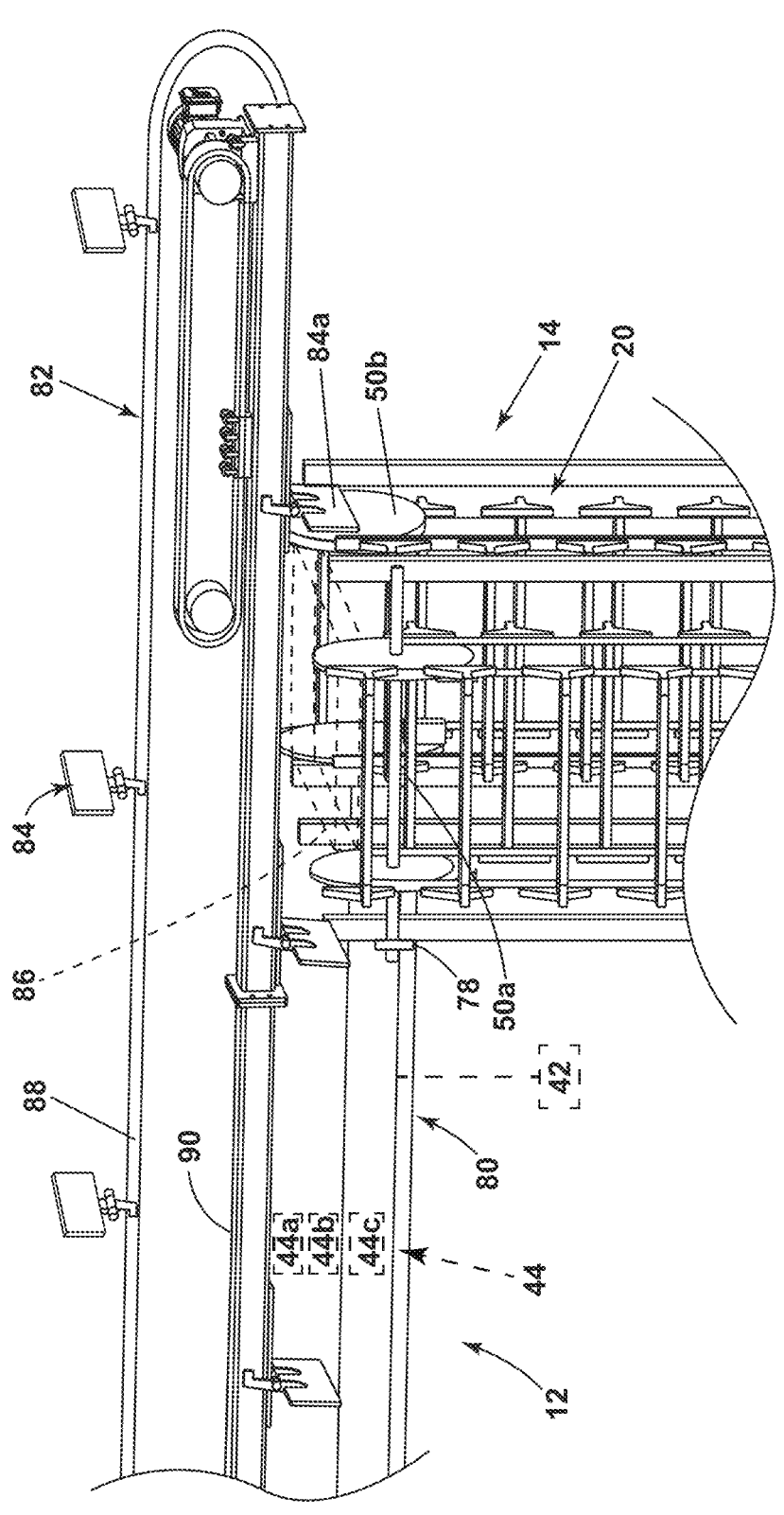
FIG. 6 is a perspective view of a portion of the loading assembly of FIG. 5 and a portion of an overhead conveyor system for use in the pallet sorting system of FIG. 1 in accordance with various aspects described herein.

FIG. 6 depicts a portion of the loading assembly 14 and a portion of the overhead conveyor system 12 having a conveyor platform 80 and a push rail 82. The push rail 82 includes at least one finger illustrated, by way of example, as a plurality of fingers 84 configured to move a pallet 86, illustrated by a dotted box, from the loading assembly 14 to the conveyor platform 80. That is, a finger 84a of the plurality of fingers 84 can push the pallet 86 off the pair of slats including the first slat 50a and the second slat 50b to a leading edge 78 of the conveyor platform 80 when the elevator 20 positions the pallet 86 at the conveyor platform 80.

The plurality of fingers 84 can be coupled to a driving mechanism including by way of non-limiting example a belt system 88 rotatably driven about a support body 90, wherein each finger of the plurality of fingers 84 is configured to move a pallet from the loading assembly 14 to the overhead conveyor system 12. That is, multiple pallets can be sequentially or horizontally located on the conveyor platform 80, where each pallet of the multiple pallets is pushed horizontally by a finger of the plurality of fingers 84 from the loading assembly 14 to the conveyor platform 80. As illustrated, by way of example, the plurality of fingers 84 coupled to the belt system 88 rotate about the support body 90 in a clockwise direction.

Optionally, the first sensor 42 can obtain information corresponding to at least one physical property of at least a portion of a pallet when the pallet is located at the conveyor platform 80. That is, the first portion, which is defined by a location in which one or more sensors obtains pallet data, can be located at the conveyor platform 80, for example. The first sensor 42 or a sensor of multiple first sensors can be coupled to one or more portions of the conveyor platform 80.

Optionally, the second sensor 44, illustrated as multiple cameras 44a, 44b, 44c can be located at or about the conveyor platform 80. As illustrated, by way of example, the cameras 44a, 44b, 44c can be a tunnel sensor that can obtain image data.

Figure 7:
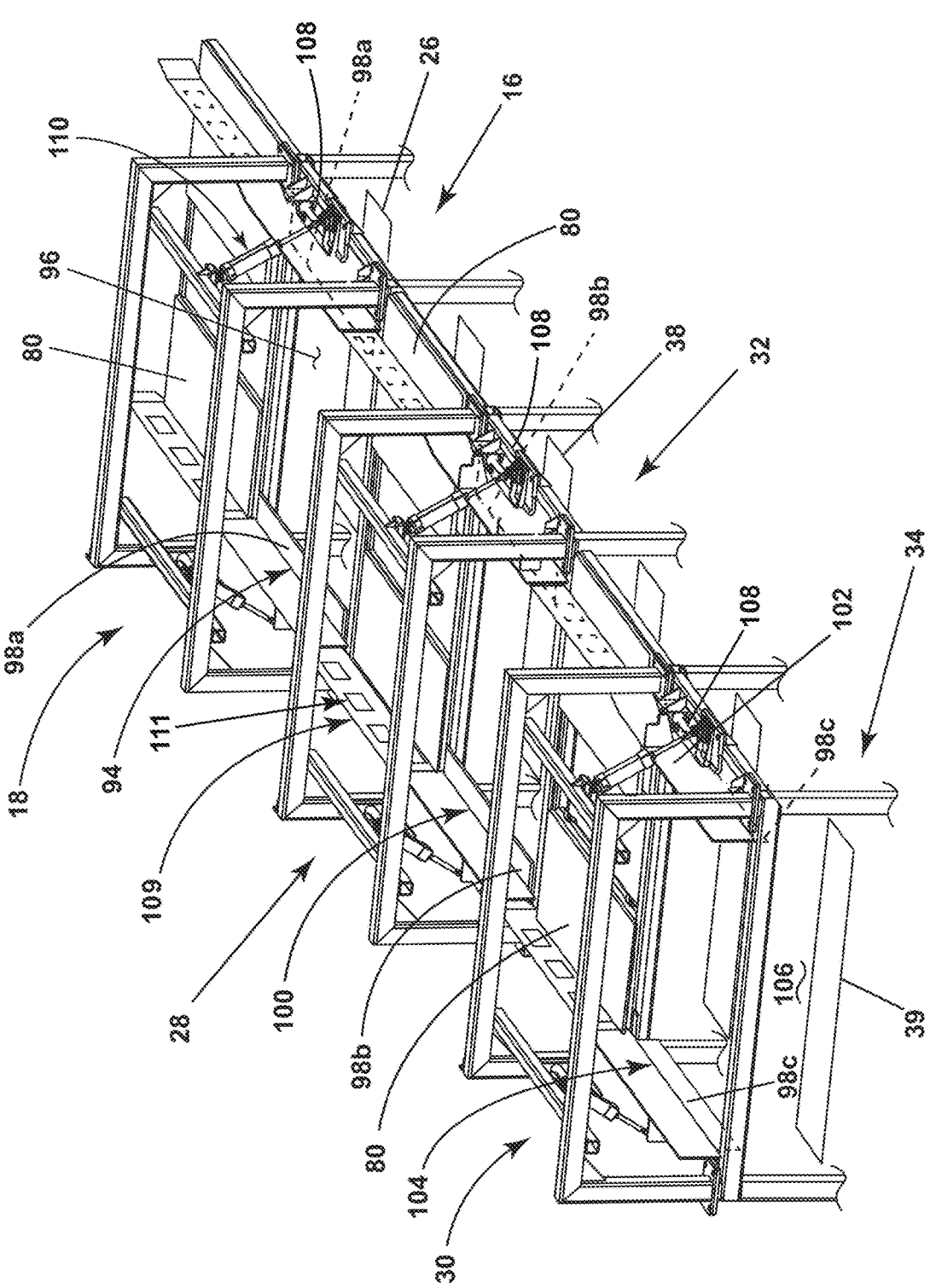
FIG. 7 is a perspective view of a portion of the overhead conveyor system and a portion of the release assembly for use in the pallet sorting system of FIG. 1 in accordance with various aspects described herein.

FIG. 7 depicts a non-limiting example of the first release assembly 18, a portion of the conveyor platform 80, and a portion of the first stacking assembly 16. The first release assembly 18, the second release assembly 28, and the third release assembly 30 couple to horizontally spaced portions of the conveyor platform 80. The first release assembly 18 includes a first portion 94 that selectively releases a pallet into the first chute 96. The first portion 94 includes two surfaces 98a illustrated in a first position. When the two surfaces 98a are in the first position the two surfaces 98a define a portion of the conveyor platform 80 and are parallel to the floor 24 (FIG. 1). That is, when the two surfaces 98a are in the first position, the pallet passes over the first chute 96 on the two surfaces 98a and continues to the next portion of the conveyor platform 80. It is contemplated that the two surfaces 98a are rotatable between the first position and a second position. In the second position, the two surfaces 98a would allow the pallet to be released into the first chute 96.

The first movable floor 27 supports the pallet when the pallet is released by the two surfaces 98a in the second position into the first chute 96.

Similar to the first release assembly, the second release assembly 28 includes a second portion 100 that selectively releases the pallet into a second chute 102. The second portion 100 includes two surfaces 98b illustrated in the first position. When the two surfaces 98b are in the first position the two surfaces 98b define a portion of the conveyor platform 80. That is, when the two surfaces 98b of the second release assembly 28 are in the first position, the pallet passes over the second chute 102 on the two surfaces 98b and continues to the next portion of the conveyor platform 80. It is contemplated that the two surfaces 98b of the second release assembly 28 are rotatable between the first position and a second position. In the second position, the two surfaces 98b would allow the pallet to be released into the second chute 102. The second movable floor 37 supports the pallet in the second stacking assembly 32 when the pallet is released by the two surfaces 98b of the second release assembly 28 into the second chute 102.

The third release assembly 30 includes a third portion 104 that selectively releases the pallet into a third chute 106. The third portion 104 includes two surfaces 98c illustrated in the second position. When the two surfaces 98c are in the second position, the two surfaces 98c have rotated away from the conveyor platform 80 and the pallet can be received by the third chute 106. The third movable floor 39 of the third stacking assembly 34 receives the pallet when the two surfaces 98c of the third release assembly 30 are in the second position.

It is contemplated that the two surfaces 98c of the third release assembly 30 are rotatable between the first position and the second position. In the first position, the two surfaces 98c define a portion of the conveyor platform 80.

It is contemplated that the motion of the two surfaces 98a, 98b, 98c can be controlled in part by one or more pistons 110. That is, the one or more pistons 110, illustrated by way of example as two pistons for each release assembly, can dampen or drive motion of the two surfaces 98a, 98b, 98c between the first position and the second position. Optionally, one or more portions of the control system 40 (FIG. 1) can drive or otherwise active the one or more pistons 110.

A lockout or pin 108 can slide horizontally to maintain the position of the two surfaces 98a, 98b, 98c. The pin 108 can, for example, keep the two surfaces 98a, 98b, 98c in the first position or closed position. For example, if the motion of the two surfaces 98a, 98b, 98c is controlled by pressurized air, the pin 108 maintains the position of the two surfaces 98a, 98b, 98c, even if the pressurized air is removed or bleeds. This can provide a safety benefit as the pin 108 can secure the two surfaces 98a, 98b, 98c in the first position or closed position during, for example, updating, cleaning, or maintenance of the overhead conveyor system 12.

Guide rails 109 are located on either side of the conveyor platform 80. The guide rails 109 can be a horizontal boundary used to maintain the horizontal position of the pallet on the conveyor platform 80. The guide rails 109 can include part of a friction brake assembly 111, discussed in further detail in FIG. 8.

Figure 8:
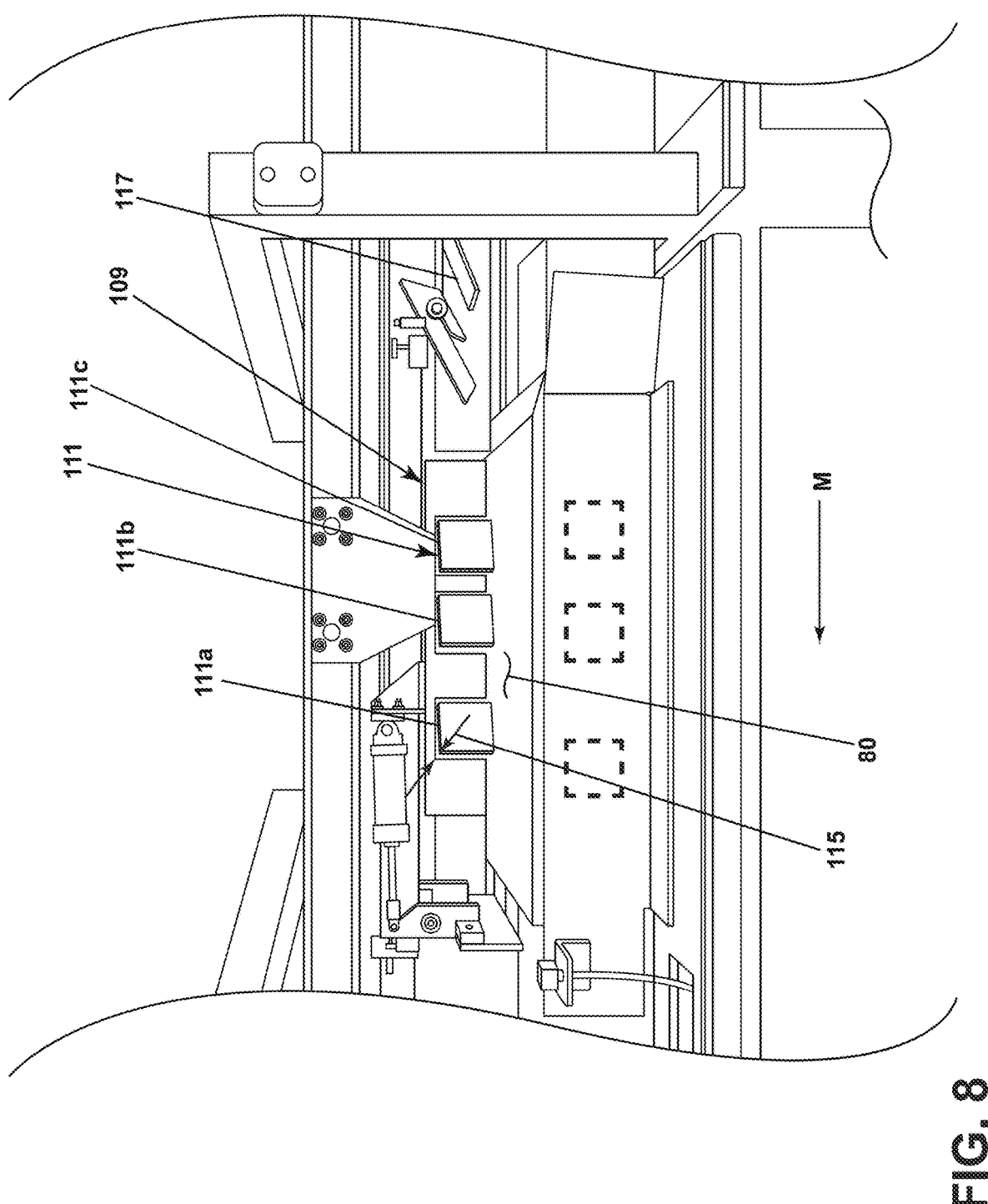
FIG. 8 is a perspective view of a portion of the overhead conveyor system of FIG. 7 further illustrating a friction brake assembly in accordance with various aspects described herein.

FIG. 8 depicts a portion of the overhead conveyor system 12, the conveyor platform 80, and the guide rails 109. The friction brake assembly 111 includes doors 111a, 111b, 111c defined by at least one guide rail of the guide rails 109. The doors 111a, 111b, 111c are movable or rotatable such that one or more portions of the doors 111a, 111b, 111c can be moved from a first position, wherein the doors 111a, 111b, 111c are flush with a main body 113 of the guide rail 109, to a second position wherein at least a portion of the doors 111a, 111b, 111c are spaced a distance 115 from the main body 113 of the guide rail 109. As illustrated, by way of example, the doors 111a, 111b, 111c are in the second position, where the distance 115 is greater than zero. In an open or second position, the doors 111a, 111b, 111c can contact at least a portion of the pallet located on the conveyor platform 80. While illustrated as having three of the doors 111a, 111b, 111c located between each stacking assembly, any number of doors on any portion of the guide rails 109 is contemplated.

The friction brake assembly 111 can also include a paddle 117. The paddle 117 is mounted above the conveyor platform 80 and is moveable or rotatable from a first position above the conveyor platform 80 to a second position above the conveyor platform 80. A distance between the conveyor platform 80 and the paddle 117 in the second position is less than a distance between the conveyor platform 80 and the paddle 117 in a first position. In an extended position or second position, the paddle 117 can contact at least a portion of the pallet located on the conveyor platform 80.

While the paddle 117 is illustrated as a single paddle, any number of paddles are contemplated. Further, any structure or device that can change position relative to the conveyor platform 80 to reduce the speed of the pallet are contemplated as part of the friction brake assembly 111.

The friction brake assembly 111 can ease the removal of the pallet from the conveyor platform 80, as needed. That is, if the user determines that the pallet can no longer or should no longer continue along the conveyor platform 80, the friction brake assembly 111 can stop the pallet in a desired location for removal. The desired location can be a region of the overhead conveyor system 12 with fewer side cross members, making removal of the pallet by the user unimpeded.

Figure 9:
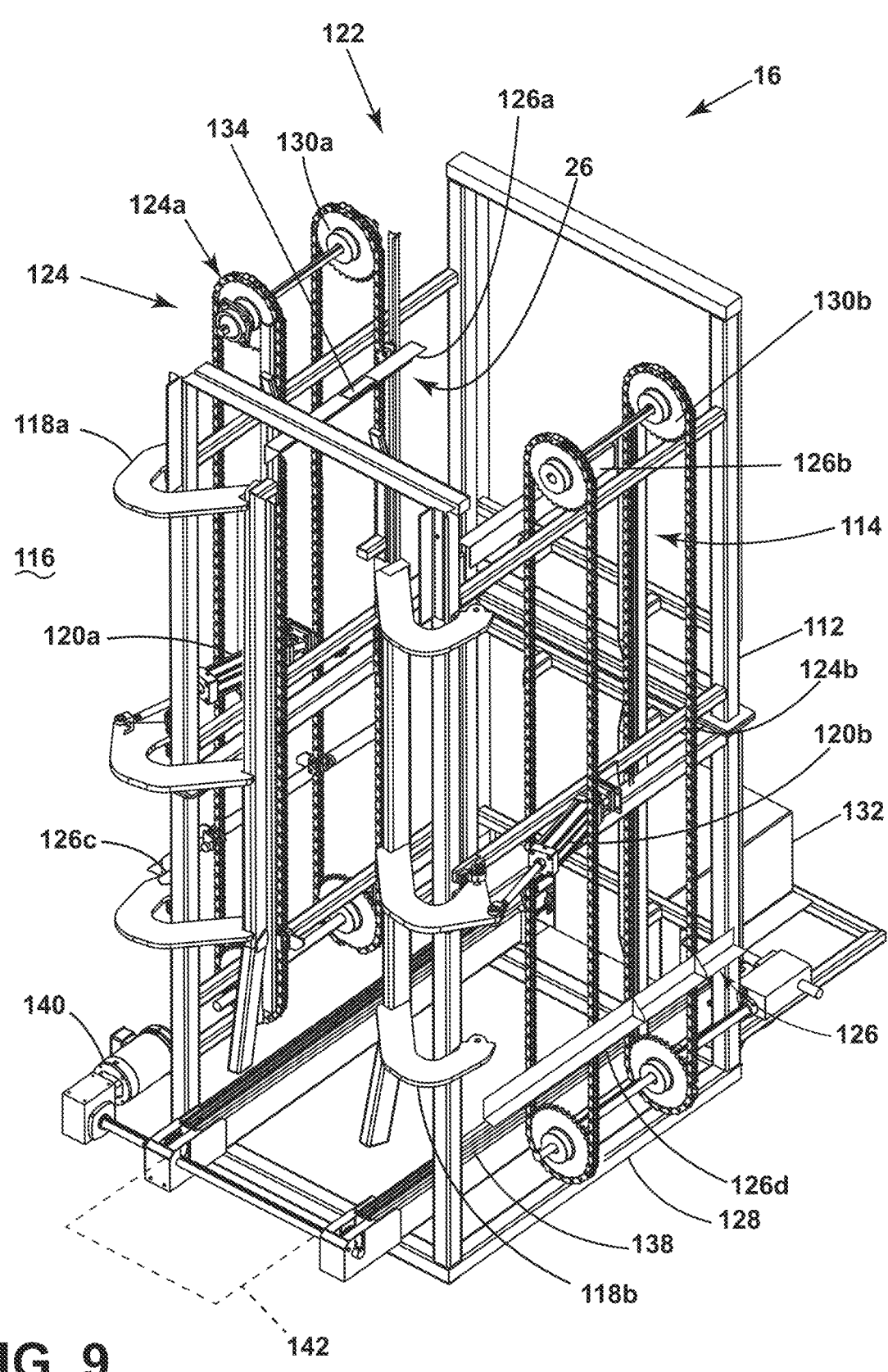
FIG. 9 is a perspective view of a stacking assembly for use in the pallet sorting system of FIG. 1 in accordance with various aspects described herein.

FIG. 9 depicts an exemplary first stacking assembly 16 that can be utilized in the pallet sorting system 10. A stacking support frame 112 defines an interior 114 of the first stacking assembly 16 and an exterior 116 of the first stacking assembly 16. It is contemplated that the stacking support frame 112 can include any number of additional beams, structures, or supports. It is further contemplated that the stacking support frame 112 can include legs, adjustable legs, or other structural aspects.

A gate, illustrated by way of example as having doors 118a, 118b, is movable from a closed position, as illustrated, to an open position. The doors 118a, 118b can be selectively coupled or rotatably coupled to the stacking support frame 112.

Pistons 120a, 120b can determine the position of the doors 118a, 118b. That is, the pistons 120a, 120b can expand or contract to move the doors 118a, 118b from the first position to the second position and vice versa.

The stacking support frame 112 includes an opening 122 that is aligned with, defines, or overlaps the first chute 96 (FIG. 7). A pallet selectively released by the first release assembly 18 (FIG. 7) can be received by the first stacking assembly 16 at the opening 122.

The first stacking assembly 16 includes the first movable floor 27 and a first height adjustment mechanism 124 operably coupled to the first movable floor 27. The movable floor 27 includes, by way of example, a plurality of platforms 126 illustrated by way of non-limiting example as four platforms including a first platform 126a, a second platform 126b, a third platform 126c, and a fourth platform 126d. The first platform 126a is paired with the second platform 126b. When the first platform 126a and the second platform 126b are located at the interior 114 they collectively define a first receiving surface of the first movable floor 27. The first platform 126a and the second platform 126b are configured to move together. That is the first platform 126a and the second platform 126b maintain the same vertical distance from a base 128 of the stacking support frame 112.

Similarly, the third platform 126c is paired with the fourth platform 126d. While illustrated at the exterior in FIG. 7 it will be understood that when the third platform 126c and the fourth platform 126d are rotated to the interior 114, the third platform 126c and the fourth platform 126d define a second receiving surface of the first movable floor 27. While illustrated as having four platforms it will be understood that the first stacking assembly 16 can include any suitable number of platforms.

A first adjustment assembly 124a, a first set of gears or wheels 130a, a second adjustment assembly 124b, and a second set of gears or wheels 130b can be included in the first height adjustment mechanism 124. The first adjustment assembly 124a moves the first platform 126a and the third platform 126c about the first set of gears or wheels 130a which intermittently rotate in a clockwise direction, when looking toward the interior 114 from the doors 118a, 118b. That is, when in the interior 114, the first platform 126a or the third platform 126c can be lowered or moved closer to the base 128 by the first adjustment assembly 124a.

The second adjustment assembly 124b moves the second platform 126b or the fourth platform 126d about the second set of gears or wheels 130b which intermittently rotate in a counterclockwise direction, when looking toward the interior 114 from the doors 118a, 118b. That is, then in the interior 114, the second platform 126b and the fourth platform 126d can be lowered or moved closer to the base 128 by the second adjustment assembly 124b.

A first motor 132 can selectively drive the first height adjustment mechanism 124. Additionally, or alternately, the motion of the first height adjustment mechanism 124 can be a result of weight, such as one or more pallets, added to the first receiving surface or the second receiving surface.

A sensor 134 can be coupled to the first stacking assembly 16 and in communication with the first height adjustment mechanism 124. An output from the sensor 134 can be used to adjust a vertical height of the first movable floor 27. The vertical height can be measured from the base 128 to a bottom or lower portion of the four platforms 126a, 126b, 126c, 126d. The sensor 134 can provide an output indicative of a number of pallets being supported by the first movable floor 27. The sensor 134 can be in communication the control system 40 (FIG. 1) or another controller, such that the vertical height of the first movable floor 27 is adjusted by the first height adjustment mechanism 124 automatically based on the output of the sensor 134.

The sensor 134 can be one or more of a force sensor, strain sensor, optical sensor, or dimensional sensor. While illustrated as a single sensor, the sensor 134 can be a plurality of sensors located at or adjacent the first stacking assembly 16.

An evacuation belt is illustrated by belts 138 located at least partially in the interior 114 of the first stacking assembly 16. The belts 138 can be driven by a second motor 140. Optionally, an exit conveyor 142 can align or couple to the first stacking assembly 16 at or adjacent the belts 138. That is, it is contemplated that a stack or plurality of pallets provided by the first stacking assembly 16 can be moved out of the interior 114 by the belts 138 to the exit conveyor 142 or another machine capable of receiving a stack of pallets. In other words, the belts 138 can move one or more pallets from first stacking assembly 16 to the exit conveyor 142 when the doors 118a, 118b to the gate are in the open position.

While illustrated as the four platforms 126a, 126b, 126c, 126d coupled to chains rotatable by gears, it is contemplated that the first height adjustment mechanism 124 can be any combination of gears, wheels, belts, or any other device that can receive a plurality of pallets and lower the plurality of pallets towards the base 128. By way of non-limiting example, the first height adjustment mechanism 124 can include a hydraulic lift.

The first stacking assembly 16 is illustrated by way of example and can include the same or similar elements as the second stacking assembly 32 (FIG. 7) having the second movable floor 37 (FIG. 7) and a second height adjustment mechanism Further the third stacking assembly 34 (FIG. 7) having the third movable floor 39 (FIG. 7) can include a third height adjustment mechanism similar to or different than the first height adjustment mechanism 124.

Referring to FIGS. 1-9, in operation, pallets are supplied to the feeder 22 of the pallet sorting system 10. The pallets can be placed sequentially on the feeder 22 by the push rails 38. By way of example, the pallets are received at the receiving portion 23 and move to the first position 26 via the rollers 31, the push rails 38, or a combination thereof. By way of further non-limiting example, in the first position 26 the first sensor 42, the second sensor 44, or any combination thereof can sense pallet data. The pallets, one at a time, are transported to the delivery portion by the feeder belt 33, the push rails 38 or a combination thereof. From the delivery portion of the feeder 22, the pallet moves to the loading assembly 14, the first repair station 51, the second repair station 53, or refuse area 49. If the pallet moves to the first repair station 51 and/or the second repair station 53, the another tunnel scanner assembly 59 can determine of the pallet, post repair, is conveyed to the receiving portion 23, the side conveyor 29, the loading assembly 14, or the refuse area 49. Ultimately, pallets to be sorted (e.g., not moved to the refuse arca 49) move into the interior 54 of the loading assembly 14 by the loading belts 58 driven by the first motor 60. The first motor 60 can continuously drive the loading belts 58 or be activated to intermittently drive the loading belts 58. Alternatively, one pallet at a time can be provided to the loading belts 58 by a machine or user.

The guide plates 46 can align the pallet that enters the loading assembly 14, to ensure it is positioned to be lifted. The loading sensor 89 ensures that the pallet is positioned properly in the interior 54 of the loading assembly 14. Once positioned completely within the interior 54, a pair of slats, for example the pair of slats including the first slat 50*a* and the second slat 50*b*, lift the pallet to the leading edge 78 of the conveyor platform 80 of the overhead conveyor system 12. Each pair of slats can lift a single pallet, therefore the loading assembly 14, having the plurality of slats 50, can lift multiple pallets at the same time, where each pallet has a corresponding pair of slats and is a different vertical height from the base 72 of the support frame 48.

The lifting of the plurality of slats 50 can be done by the vertical belt system 52 selectively or continuously driven by the second motor 74. In other words, the multiple pairs of slats of the plurality of slats 50 lift upward two or more pallets spaced vertically to be received sequentially by the overhead conveyor system 12. It is contemplated that any number of sensors or communication between speed of the vertical belt system 52, the feeder 22, or other aspects of the loader can be controlled by one or more controller, such as, for example, the control system 40.

A finger, illustrated as the finger 84*a*, can move the pallet at the leading edge 78 off the pair of slats, for example the first slat 50*a* and the second slat 50*b*, and onto the conveyor platform 80. Prior to loading, during loading, during lifting, or during the movement of the pallet along the conveyor, a conveyance path is assigned to the pallet by one or more portions of the control system 40. The conveyance path determines which release assembly, illustrated as the first release assembly 18, the second release assembly 28, or the third release assembly 30, is to be activated.

By way of non-limiting example, if the pallet were given a conveyance path that resulted in the pallet being transported to the first stacking assembly 16, then one or more portions of the control system 40 would move the first portion 94 or the two surfaces 98*a* of the first release assembly 18 into the open or second position at a time corresponding to the arrival of the pallet at the first release assembly 18. Opening or moving the first portion 94 or the two surfaces 98*a* to the second position releases the pallet into the first chute 96. The pallet does not have far to move, as the first movable floor 27 receives the pallet from the first chute 96. The detection of the pallet being added to the first stacking assembly 16 can be done by the sensor 134, manual entry by a user, or the compressive force of the pallet.

The pallets can move quickly on the conveyor platform 80 due to the friction brake assembly 111. The friction brake assembly 111 slows the pallets to stop in a predictable and predetermined location. This allows the pallet to travel faster until reaching the pre-determined release assembly 18, 28, 30. The friction brake assembly 111 can decrease cycle time by at least increasing pallet speed along the conveyor platform 80. That is, the pallet can travel much faster along the conveyor platform 80 as precise control of the stop location of the pallet is determined by the friction brake assembly 111. As used herein, the term "cycle time" can be the length of time it takes the pallet to be received at a sorting location, a destination determined, and the pallet to be transported to the determined destination. Transportation of the pallet to the determined destination can be manual, machine assisted (e.g., forklift), or automated (e.g., conveyor). For example, a cycle time of the pallet sorting system 10 can be the time from the pallet received at the receiving portion 23 of the feeder 22 until the pallet reaches the predetermined movable floor 27, 37, 39. Alternatively, the cycle time can be the length of time from the pallet's arrival at the loading assembly 14 to coming to rest at the predetermined movable floor 27, 37, 39.

The friction brake assembly 111 can decrease cycle time over traditional methods by at least 10%. For example, the friction brake assembly 111 can decrease cycle time by at least 20%.

The loading assembly 14, being vertical, can further shorten the cycle time by shortening the overall travel distance of the pallet. The combination of the friction brake assembly 111 and shorter travel distance provided by the loading assembly 14 can further decrease cycle time. The friction brake assembly 111 and loading assembly 14 can decrease cycle time. For example, the friction brake assembly 111 and loading assembly 14 can decrease cycle time by at least 20%. By way of further example, the friction brake assembly 111 and loading assembly 14 can decrease cycle time by at least 33% (e.g., from 4.5 seconds to 3.0 seconds). For example, the cycle time or time it takes to transport the pallet to a second position can be less than 4.5 seconds. By way of further example, the cycle time or time it takes to transport the pallet to a second position can be less than 3.5 seconds. In another non-limiting example, the cycle time can be in a range from 3 to 4 seconds. A decrease in cycle time increases the throughput of pallets per hour or shift. This is a long-felt need in the industry to decrease cycle time increase throughput of previous pallet sorting systems.

Once the pallet is received by the first movable floor 27, the vertical height of the first movable floor 27 can be adjusted by the first height adjustment mechanism 124, so that when another pallet with a grade of "A," is provided to the conveyor platform 80, there is room for it to be stacked on top of the received pallet within the first stacking assembly 16. The first height adjustment mechanism 124 can be automatic based on the output of the sensor 134, manually activated/adjusted, or move in response to the gravitational force from the pallet.

Once the first stacking assembly 16 has reached a predetermined number of pallets, or if the cycle of operation of the pallet sorting system 10 is complete, the doors 118*a*, 118*b* of the first stacking assembly 16 can be moved to an open position automatically or manually. The stack or set of grade "A" pallets can be moved from the interior 114 of the first stacking assembly 16 to the exterior 116. A machine or exit conveyor 142 can receive the stack of pallets from the first stacking assembly 16.

Figure 10:
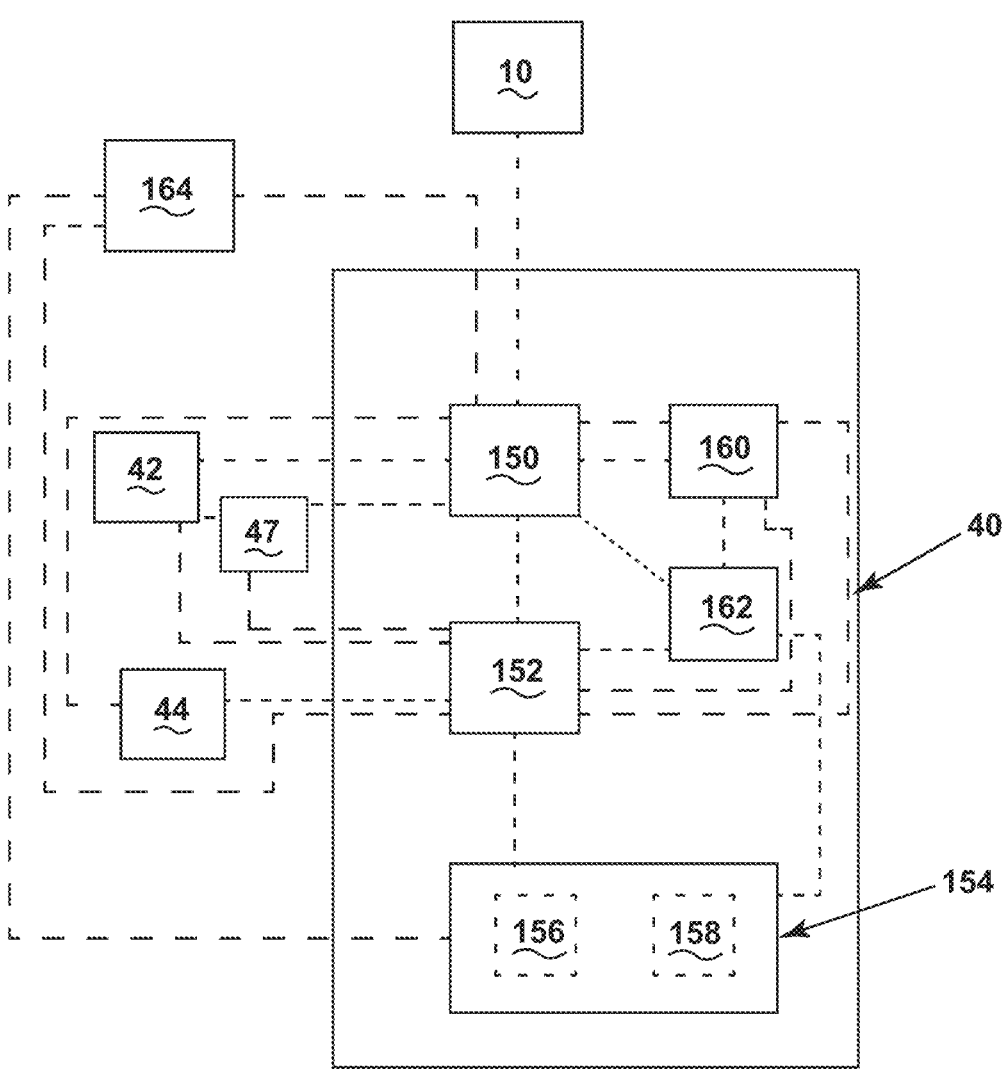
FIG. 10 is a schematic view of a control system for use in the pallet sorting system of FIG. 1 in accordance with various aspects described herein.

FIG. 10 further illustrates the control system 40 and communicating components. While illustrated as in communication with the pallet sorting system 10 (e.g., pallet sorting system having an overhead conveyor), it is contemplated that the control system 40 can be in communication with any type of pallet sorting system. It is further contemplated that the pallet sorting system can be implemented with any suitable number of conveyance mechanisms to move one or more pallets.

The control system 40 can include a controller module 150, a logic module 152, and a machine learning module 154. The controller module 150, a logic module 152, and a machine learning module 154 can be included in a single server, located at multiple computing devices, or portions of the control system 40 can be operated or stored remotely (e.g., the cloud).

The controller module 150 is in communication with the pallet sorting system 10. That is, the controller module 150 can provide communication to mechanically operate the pallet sorting system 10 to move a pallet from a first location to finite number of second locations based on the conveyance path provided to the controller module 150. It is contemplated that the controller module 150 can be updated, maintained, or otherwise programmed remotely via, for example, a web portal.

The logic module 152 is in communication with the controller module 150. The conveyance path of a pallet is provided to the controller module 150 from the logic module 152. The logic module 152 can be configured to communicate with a pre-existing controller module 150. That is, the logic module 152 can be added to a pre-existing control system 40 with a pre-existing controller module 150.

The logic module 152 can be configured by a user or an application programming interface. The configuration of the logic module 152 depends on the pallet sorting system 10, the controller module 150, and the origin or type of pallets to be received by the pallet sorting system 10. By way of non-limiting example, a sorting configuration for the logic module 152 can depend on the conveyor system layout. By way of further non-limiting example, the conveyor system layout can be a floor style conveyor, an overhead conveyor, or combination thereof. The floor style conveyor or the overhead conveyor can include, for example, one or more of a belt, rollers, or motorized rollers. The sorting configuration also takes into account the pallet population. Pallet population can include the number of pallets to be sorted in a predetermined time interval and the origin or type of pallet, which is determined by manufacturer, material, size, design, color data, or any combination thereof.

The first sensor 42 can be in communication with the controller module 150. The controller module 150 can activate the first sensor 42. That is, the start and stop of gathering data from the first sensor 42 can be controlled by the controller module 150. The output from the first sensor 42 can define a first set of pallet data. The first set of pallet data can be received by the controller module 150 and communicated to the logic module 152. Alternatively, the first set of pallet data from the first sensor 42 can be communicated from the first sensor 42 to the logic module 152. It is further contemplated that the first sensor 42 upstream of the tunnel sensor assembly 41 can provide information related to the motion of the pallet, including position. The information or data from the first sensor 42 can be used to trigger one or more second sensors (e.g., one of more sensors in the tunnel sensor assembly 41).

The second sensor 44 can be in communication with the logic module 152. The logic module 152 can activate the second sensor 44, or communicate to the controller module 150 to activate the second sensor 44. That is, the start and stop of gathering image data from the second sensor 44 can be controlled by the logic module 152, the controller module 150, or a combination thereof. The output from the second sensor 44 can define a second set of pallet data or a set of image data. The second set of pallet data can be received by the logic module 152. Alternatively, the second set of pallet data can be communicated to the logic module 152 via another module.

While illustrated as in communication with a first sensor and a second sensor, it is contemplated that portions of the control system can be in communication with any number of sensors, including one.

The illumination source 43 can be in communication with the logic module 152 or the second sensor 44. The logic module 152 or second sensor 44 can activate the illumination source 43 or communicate to the controller module 150 to activate the illumination source 43. That is, the second sensor 44, the logic module 152, the controller module 150, or a combination thereof can turn on or off the illumination source 43. It is contemplated that the illumination source 43 can be integrated with the second sensor 44. While the illumination source 43 is illustrated as a single source, any number of illumination sources are contemplated.

The logic module 152 is in communication with the machine learning module 154. The logic module 152 can communicate a subset of pallet data that includes one or more of the first set of pallet data or the second set of pallet data to the machine learning module 154. The subset of pallet data can include all or less than all of the first set of pallet data, the second set of pallet data, or a combination thereof. By way of one non-limiting example, the subset of pallet data can include all of the first set of pallet data and a portion of the second set of pallet data. The machine learning module 154 can determine a third set of pallet data or a set of learned data based on the subset of pallet data provided by the logic module 152. The third set of pallet data can include at least one of a color data, a grade, or a discontinuity rank.

The machine learning module 154 utilizes real-time sensor information and artificial intelligence network data structures with neural networks for modelling characteristics and information related to pallets passing by the sensors.

Optionally, the machine learning module 154 can include at least two models illustrated as a first model 156 and a second model 158. The subset of pallet data or at least a portion of the subset of the pallet data can be provided to the first model 156, which can determine, for example, color data. The second model 158 can provide block data, wherein the third set of pallet data communicated from the machine learning module 154 to the logic module 152 can include at least a pallet grade of the pallet based on the color data from the first model 156 and the block data from the second model 158. It is contemplated that the pallet grade is based on the color data from the first model 156 combined with the block data from the second model 158. Alternatively, the pallet grade is based on the block data from the second model 158, where the second model 158 receives the color data from the first model 156 prior to determining the block data.

The control system 40 can further include or operably couple to one or more of a memory 160, an internet communication device 162, or a user interface 164. The memory 160 can be used for storing the control software, reference data, collected data, or any combination thereof. The memory 160 can be in communication with one or more of the controller module 150, the logic module 152, or the machine learning module 154. The memory 160 may be used for storing, among other things, the control software that may be executed by the controller module 150, the logic module 152, or a combination thereof for using the pallet sorting system 10 and any additional software. The memory 160 can also store information, such as a database or table, and store data received from one or more components of the combination pallet sorting system 10 that may be communicably coupled with the control system 40. The database or table can store the various operating parameters for the one or more cycles of operation, including factory default values for the operating parameters and any adjustments to them by the control system or by user input.

The control system 40 may be communicably and/or operably coupled with one or more components of the pallet sorting system 10 for communicating with and controlling the operation of the component to complete sorting and accumulation of pallets. The control system 40 may also be coupled with the imaging device and illumination source to capture one or more images of the tunnel and any pallet therein. The captured images may be sent to the control system 40 and analyzed using analysis software stored in the memory 160 to determine information or characteristics related to the pallet. The control system 40 may use the determined information to set a conveyance path. It is also contemplated that the imaging device can include a memory and a microprocessor for storing information and software and executing the software, respectively. In this manner, the imaging device may analyze the captured image data and communicate the results of the analysis with the control system 40.

The internet communication device 162 can be any kind of connection, either wired or wireless, configured to communicate with other devices or the cloud over a global, local, and/or personal area networks, for example. By way of non-limiting example, the internet communication device 162 can be one or more of an antenna for sending and receiving electromagnetic waves (e.g., radio waves), ethernet connection, modem, or router, configured to communicate with at least the cloud or remote server.

For example, the control system 40 can operably couple to the conveyance system (e.g., the feeder 22, the loading assembly 14, the conveyor platform 80) and the tunnel scanner assembly 41. The control system 40 is configured to receive image data from the multiple cameras and non-image data from the sensor. The control system 40 can determine, from the image data and the non-image data, information related to the pallet located at least partially within the tunnel scanner assembly 41. The control system 40 can provide or determine a conveyance path for the pallet based thereon, and activate the conveyance system or the overhead conveyor system 12 to transport the pallet along the conveyance path.

The user interface 164 can be operably coupled to the control system 40. The user interface 164 can send or receive data via one or more of the controller module 150, the logic module 152, or the machine learning module 154. That is, the user interface 164 can provide an input and output function for the control system 40. The user interface 164 can include one or more knobs, dials, switches, displays, touch screens and the like for communicating with the user, such as to receive input and provide output. For example, the displays can include any suitable communication technology including that of a liquid crystal display (LCD), a light-emitting diode (LED) array, or any suitable display that can convey a message to the user. The user can enter different types of information including, without limitation, information related to the conveyance path, pallet population, pallet origin or type, physical property of the pallet, condition of the pallet, provide training for the machine learning module 154, or number of pallets allowed in each stacking assembly 16, 32, 34 (FIG. 1). The user interface 164 can also provide outputs relates to possible repair recommendation, other information related to pallet condition, the conveyance path, or a number of pallets currently located in each of the stacking assemblies 16, 32, 34 (FIG. 1). Other communications paths and methods can also be included in the pallet sorting system 10 and can allow the control system 40 to communicate with the user in a variety of ways. For example, the control system 40 can be configured to send a text message to the user, send an electronic mail to the user, or provide audio information to the user either through the pallet sorting system 10 or utilizing another device such as a mobile phone.

Figure 11:
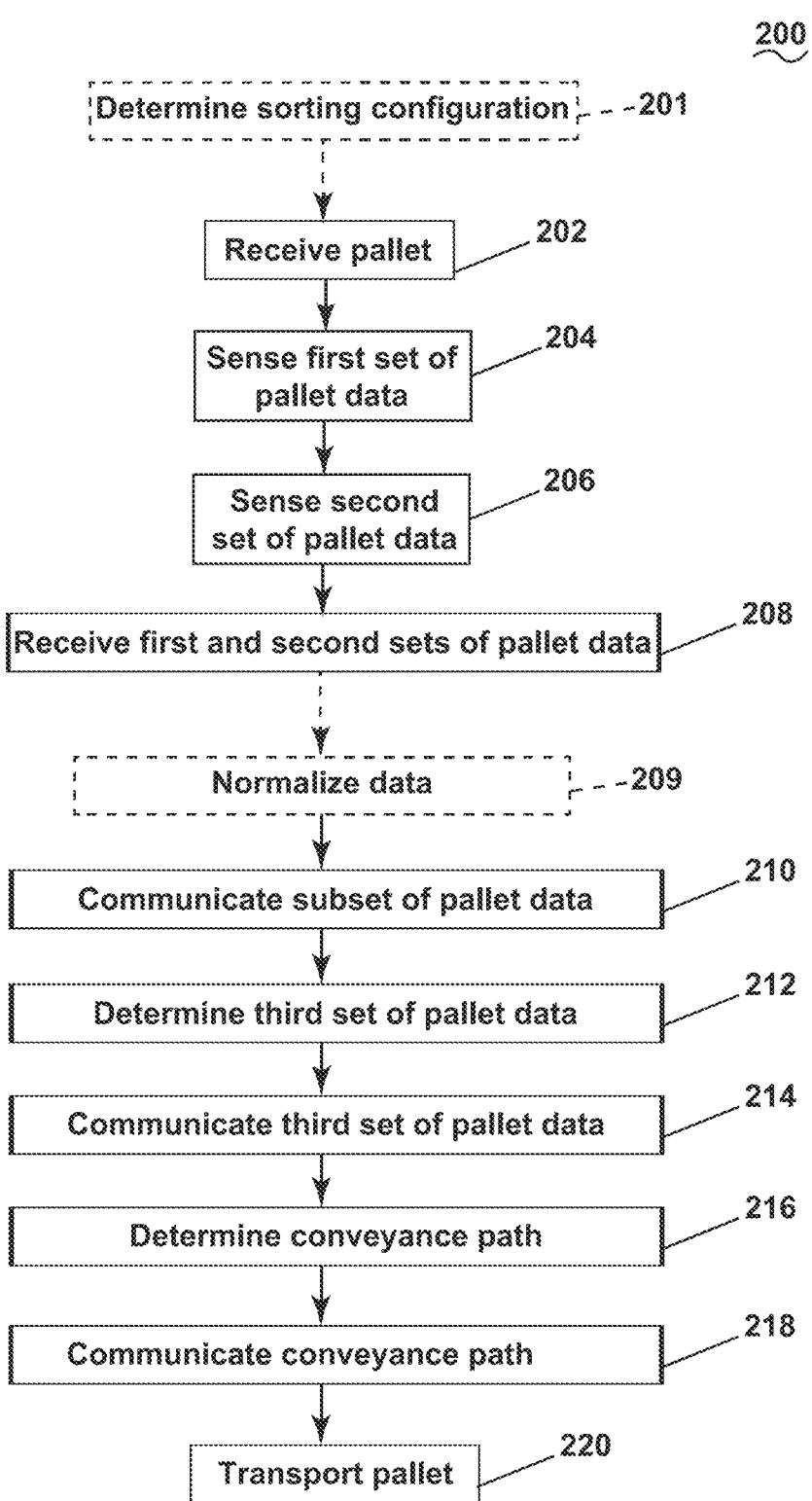
FIG. 11 is a flow chart diagram illustrating a method for conveying a pallet through the pallet sorting system of FIG. 1 in accordance with various aspects described herein.

FIG. 11 illustrates a method 200 for conveying a pallet through the pallet sorting system 10. While illustrated as the pallet sorting system 10, any pallet sorting system is contemplated. Optionally, at 201, a sorting configuration for the pallet sorting system 10 is determined based on the design and type of pallet sorting system, the controller module, and the type of pallets to be received by the pallet sorting system. The sorting configuration provided to the logic module 152 can include one or more predetermined thresholds, requirements, or classifications of pallets. The sorting configuration also includes all possible conveyance paths based on the type of pallet sorting system.

At 202 a pallet is received at the first position. The first position can be, by way of non-limiting example, the first position 26 of the feeder 22 or the leading edge 78 the overhead conveyor system 12. It is contemplated that the first position can be located at any portion of the feeder 22, the loading assembly 14, the overhead conveyor system 12. At 204, the first sensor 42, the sensor 41*d*, the upper sensor 41*h*, or any combination thereof senses a first set of pallet data. The first set of pallet data is non-image data. Optionally, the first sensor 42 the sensor 41*d*, the upper sensor 41*h*, or any combination thereof can be included in or coupled to the conveyor platform 80. Additionally, or alternatively the first sensor 42, the sensor 41*d*, the upper sensor 41*h*, or any combination thereof can be located at the loading assembly 14 or another portion of the overhead conveyor system 12.

At 206, a second set of pallet data is obtained. The second set of pallet data is obtained by optical sensors illustrated as the multiple cameras 41*a*, 41*b*, 41*c*, 41*e*, 41*f*, 41*g*. Therefore, the second set of pallet data is image data or image-based data provided by the optical sensors. The tunnel scanner assembly 41 is illustrated about a portion of the feeder 22, however, it is contemplated that the tunnel scanner assembly 41 can in part or in full be located about a portion of the loading assembly 14 or the conveyor platform 80, or any combination thereof.

Optionally, one or more of the first sensor 42, the sensor 41*d*, the upper sensor 41*h*, multiple cameras 41*a*, 41*b*, 41*c*, 41*e*, 41*f*, 41*g* can be activated by the controller module 150 or the logic module 152 based on information or data provided by one or more additional sensors (e.g., encoder, LiDAR, motion sensor).

At 208, the controller module 150, the logic module 152, or a combination thereof receive the first set of pallet data and the second set of pallet data. By way of non-limiting example, the first set of pallet data is received by the controller module 150 and communicated to the logic module 152 and the second set of pallet data is provided by the second sensor 44 to the logic module 152. Alternatively, the first set of pallet data can be received by the logic module 152.

It is contemplated that either the second sensor 44 or the control system 40 can analyze the image to determine the second set of pallet data. This can be included in the receiving or transmitting or can be included in a separate portion of the method. Analyzing the image may include separating the pallet image from the background, i.e. the interior of the tunnel 45. Any suitable method may be used to separate the pallet from the background in the image. There are several methods for separating the pallet image from the background depending on the illumination configuration, tunnel properties and the pallet. Further still, the image separation techniques may also be used to separate one pallet item from another. For example, techniques such as edge detection, color segmentation and deviation from a known background image may be used to separate the pallet from the background. Edge detection may be calculated using known methods. Color segmentation involves separating the individual items in a pallet from each other and separating the pallet from the background based on differences in the saturation, hue and luminance of objects in the image. The surface of the interior of the tunnel may also contain optically detectable features to aid in the separation of the pallet from the background image of the tunnel. Regardless of how the pallet image is separated from the background, the images captured by the imaging device may be used to obtain information relating to the pallet and to form the second set of pallet data.

Optionally, at 209, the logic module 152 can resize or normalize the second set of pallet data. That is, the logic module 152 can receive image data and process, use regression, or other mathematical or analytical methods to resize or normalize the images or image data obtained by the cameras of the second sensor 44.

At 210, the logic module 152 selectively communicates at least one subset of pallet data from the first set of pallet data, the second set of pallet data, or a combination thereof from the logic module 152 to the machine learning module 154. By way of non-limiting example, the subset of pallet data can include all of the first set of pallet data and a portion of the second set of pallet data. By way of further example, the subset of pallet data can include all of the second set of pallet data and a portion of the first set of pallet data. Additionally, or alternatively, the logic module 152 can process data from the first set of pallet data or the second set of pallet data, or any combination thereof. Therefore, it is contemplated that the subset of pallet data can include processed data, data directly from the first set of pallet data or the second set of pallet data, or any combination thereof.

At 212, the machine learning module 154 determines a third set of pallet data based on the subset of pallet data. The machine learning module 154 can analyze image data or the subset of the pallet data by using image recognition algorithms and other image processing techniques to identify patterns and generate insights. The machine learning module 154 can use deep learning datasets to distinguish patterns in images, Convolutional Neural Networks (CNNs) to process visual data to learn patterns, textures, and high-level features for object detection and classification, image segmentation, multimodal embeddings where images are converted to coordinates in a multidimensional vector space prior to analysis, or any combination thereof.

The third set of pallet data can include at least one of a color data, a grade, or a discontinuity rank. The color data can include data corresponding to one or more of red, blue, green, white, or other and wherein the color data. The grade can be one or more of a letter, a number, or a symbol indicating a classification or predetermined threshold for a specific type of pallet is met. The discontinuity rank, for example, can be determined at least in part from a reference pallet or set of reference data, where aspects of the pallet to be sorted deviate or are discontinuous with the reference pallet or reference data. By way of non-limiting example, aspects that would change a discontinuity rank of the pallet to be sorted can include missing or protruding fasteners, holes in a pallet surface that exceed a predetermined threshold for the pallet type, missing portions, depth and/or frequency of cracked portions that exceed a predetermined threshold for the pallet type, leading board side inconsistencies that exceed a predetermined threshold for the pallet type, inconsistencies of the bottom boards or bottom portions of boards that exceed a predetermined threshold for the pallet type, inconsistencies of the top boards or top portions of boards that exceed a predetermined threshold for the pallet type, inconsistencies in the fork gap pocket that exceed a predetermined threshold for the pallet type, inconsistencies of boards spacing that exceed a predetermined threshold for the pallet type, or any combination thereof.

The reference pallet information for color data, grade, predetermined thresholds for discontinuity ranking as well as identifying characteristics of various pallets can be provided to one or more of the memory 160, the logic module 152, or the machine learning module 154 during configuration of the control system 40.

At 214, the third set of pallet data is communicated from the machine learning module 154 to the logic module 152. At 216, the logic module 152 can further process the third set of pallet data to determine the conveyance path that corresponds to the pallet received at the first position.

At 218, the conveyance path is communicated to the controller module 150. At 220, the controller module 150 communicates with aspect of the pallet sorting system 10 to transport the pallet from the first position to a second position. By way of example, the controller module 150 operable controls the pallet sorting system 10 such that the pallet is placed in the correct stacking assembly 16, 32, 34.

The pallet is delivered via the corresponding release assembly to a predetermined stacking assembly. That is, the stacking assembly which will receive the pallet is determined by the logic module 152 based on input from the machine learning module 154.

For example, if the pallet's grade corresponded to the third stacking assembly 34, then the controller module 150 would move the two surface 98c of the third releasing assembly 30 into the second position, allowing the pallet to enter the third chute 106 and be received by the third stacking assembly 34. The pallet, within the third stacking assembly 34 is supported by the third movable floor 39.

The friction brake assembly 111 ensures proper location of the pallet relative to the correct release assembly 18, 28, 30. The friction brake assembly 111 can include any number of sensors, such as, but not limited to, speed sensors or location sensors that increase or decrease the distance 115. That is, optionally, the friction brake assembly 111 can include real time control for the pallet and can adjust the doors 111a, 111b, 111c and the paddle 117.

The vertical height of the movable floor is adjusted based on the delivery of the pallet. Continuing with the non-limited example, the third movable floor 39, upon supporting a pallet (or an additional pallet) is moved down by the third height adjustment mechanism. That is, the adjusting of the vertical height of the movable floor 39 upon delivery of the pallet includes a lowering of the third movable floor 39 by the third height adjustment mechanism.

Figure 12:
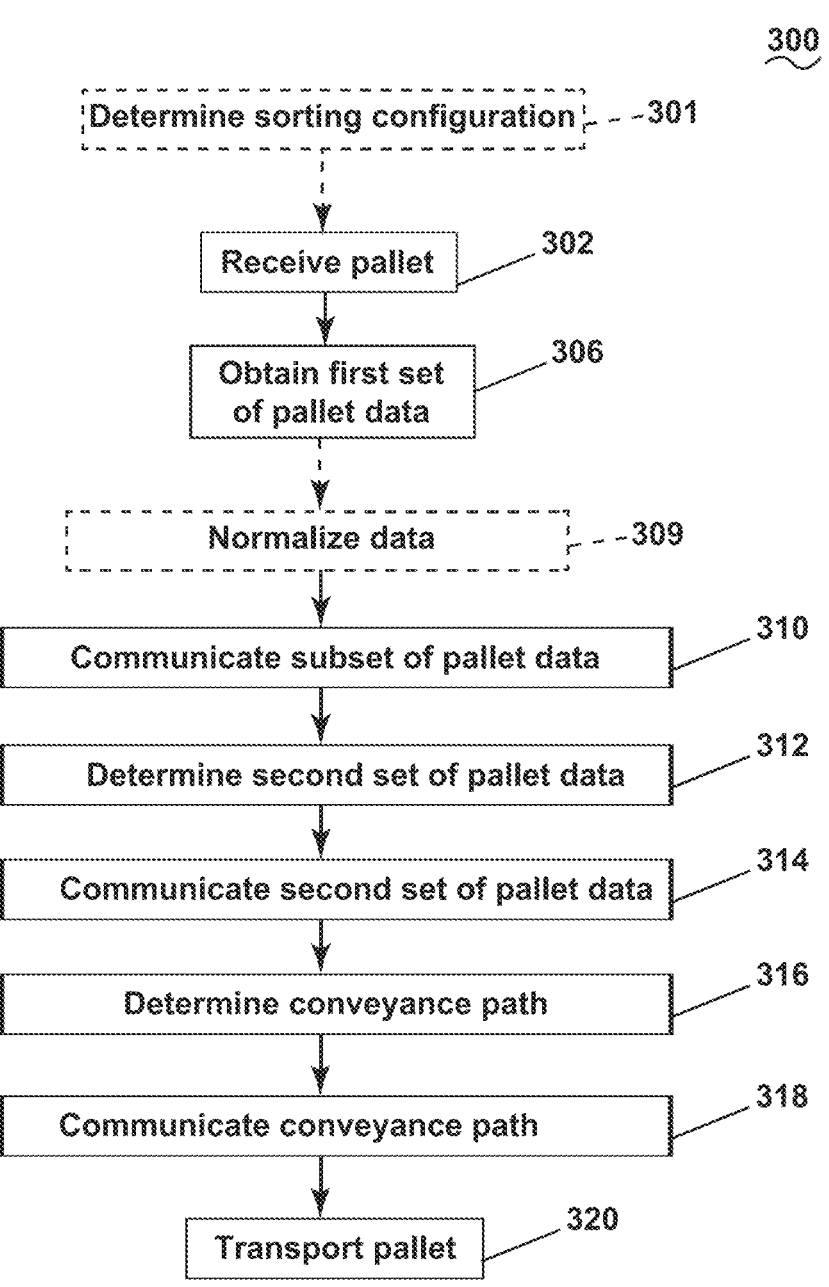
FIG. 12 is a flow chart diagram illustrating a method for conveying a pallet through the pallet sorting system of FIG. 1 in accordance with various aspects described herein.

FIG. 12 illustrates a method 300 for conveying a pallet through the pallet sorting system 10. The method 300 is similar to the method 200, therefore, like parts will be identified with like numerals increased by 100, with it being understood that the description of the like parts of the method 200 applies to the method 300, except where noted. While illustrated as the pallet sorting system 10, it is contemplated that the method 300 can be used by any pallet sorting system.

Optionally, at 301, a sorting configuration for the pallet sorting system 10 is determined based on the design and type of pallet sorting system, the controller module, and the type of pallets to be received by the pallet sorting system. The determined sorting configuration is provided to the logic module 152 can include, for example, one or more prede- termined thresholds, requirements, or classifications of pal- lets. The sorting configuration can also include all possible conveyance paths based on the design or layout of pallet sorting system.

At 302 a pallet is received at a first position. The first position can be, by way of non-limiting example, the first position 26 of the feeder 22 or the leading edge 78 the overhead conveyor system 12. It is contemplated that the first position can be located at any portion of the feeder 22, the loading assembly 14, or the overhead conveyor system 12.

At 306, the second sensor 44 senses a first set of pallet data. The second sensor 44 The second sensor 44 is an optical sensor. Therefore, the first set of pallet data is image data or image-based data provided by the optical sensor. The optical sensor can be one or more cameras. By way of non-limiting example, the second sensor 44 can be multiple cameras forming a tunnel sensor about a portion of the feeder 22, the loading assembly 14, or the conveyor platform 80. The first set of pallet data including image data is received at the logic module 152.

Optionally, at 309, the logic module 152 can resize or normalize the first set of pallet data. That is, the logic module 152 can receive image data and process, use regression, or other mathematical or analytical methods to resize or nor- malize the images or image data obtained by the cameras of the second sensor 44.

At 310, the logic module 152 selectively communicates a subset of pallet data from the first set of pallet data to the machine learning module 154. The subset of pallet data can include all of the first set of pallet data or a portion of the first set of pallet data. Further the subset of pallet data can include normalized images from all of the first set of pallet data or a portion of the first set of pallet data. That is, the subset of pallet data can include any combination of image data, normalized image data, or data determined from processing an image.

At 312, the machine learning module 154 determines a second set of pallet data based on the subset of pallet data. To determine the second set of pallet data, the machine learning module 154 can analyze image data or the subset of the pallet data by using image recognition algorithms and other image processing techniques to identify patterns and generate insights. The machine learning module 154 can use deep learning datasets to distinguish patterns in images, Convolutional Neural Networks (CNNs) to process visual data to learn patterns, textures, and high-level features for object detection and classification, image segmentation, multimodal embeddings where images are converted to coordinates in a multidimensional vector space prior to analysis, or any combination thereof.

By way of non-limiting example, the machine learning module 154 can provide at least a portion of the subset of pallet data to the first model 156 which can be, for example, a color model that can determine, for example color data. The subset of pallet data, a portion of the subset of the pallet data, the color data, or any combination thereof can be provided to the second model 158. The second model can determine, for example, block data. That is, the second set of pallet data can include or depend on color data, block data, or a combination thereof.

At 314, the second set of pallet data is communicated from the machine learning module 154 to the logic module 152. At 316, the logic module 152 determines the convey- ance path that corresponds to the pallet received at the first position based on the second set of pallet data.

At 318, the conveyance path is communicated from the logic module 152 to the controller module 150. At 320, the controller module 150 communicates with aspect of the pallet sorting system 10 to transport the pallet to a second position according to the communicated conveyance path.

Benefits of aspects of the disclosure include faster and more accurate sorting of a plurality of pallets. The control system can improve both the speed and accuracy with which the plurality of pallets are sorted.

The control system provides delegation of tasks, where the controller module generally runs the physical movement of components of the pallet sorting system. The logic module gathers, processes, and communicates information with the user, the controller module, various sensors, and the machine learning module. The machine learning module processes data provided by the logic module. This delega- tion provides flexibility within the system where pre-exist- ing pallet sorting systems with preexisting controller mod- ules can be outfitted with a complementary logic module and machine learning module. Further, this configuration allows aspects of the machine learning module to be updated or changed without impacting the function of the logic module or the controller module.

Figure 13:
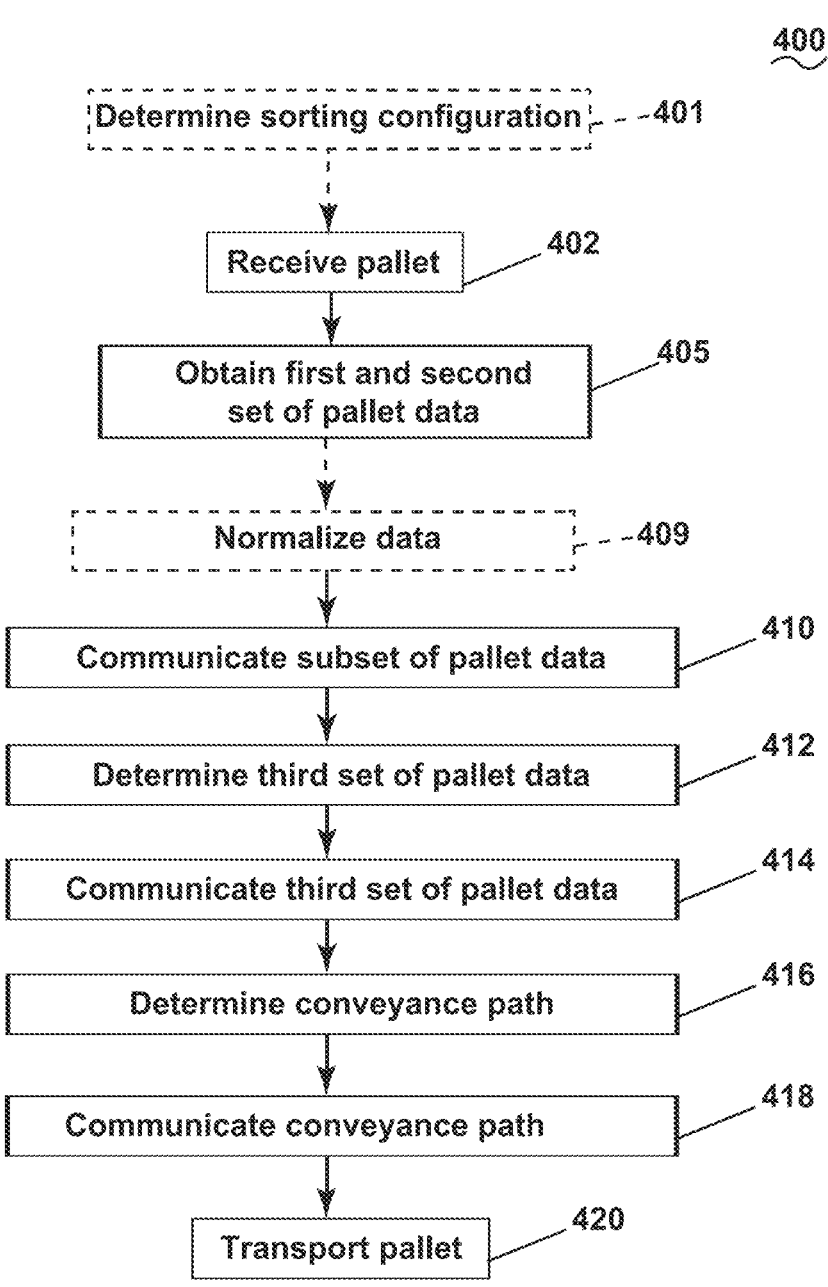
FIG. 13 is a flow chart diagram illustrating a method for conveying a pallet through the pallet sorting system of FIG. 1 in accordance with various aspects described herein.

FIG. 13 illustrates a method 400 for conveying a pallet through the pallet sorting system 10. The method 400 is similar to the method 200, 300, therefore, like parts will be identified with like numerals further increased by 100, with it being understood that the description of the like parts of the method 200, 300 applies to the method 400, except where noted. While illustrated as the pallet sorting system 10, it is contemplated that the method 400 can be used by any pallet sorting system.

Optionally, at 401, a sorting configuration for the pallet sorting system 10 is determined based on the design and type of pallet sorting system, the controller module, and the type of pallets to be received by the pallet sorting system. The determined sorting configuration is provided to the logic module 152 can include, for example, one or more prede- termined thresholds, requirements, or classifications of pal- lets. The sorting configuration can also include all possible conveyance paths based on the design or layout of pallet sorting system.

At 402 a pallet is received at a first position. The first position can be, by way of non-limiting example, the first position 26 of the feeder 22 or the leading edge 78 the overhead conveyor system 12. It is contemplated that the first position can be located at any portion of the feeder 22, the loading assembly 14, the overhead conveyor system 12, or conveyance system.

At 405, the first set of pallet data and the second set of pallet data are sensed. The first set of pallet data can be sensed with one or more sensors that provide non-image data as the first set of pallet data. The non-image sensor or sensors used to sense the first set of pallet data can include an emission portion and a detection portion. That is, the non-image sensor or sensors can emit an electromagnetic signal that is at least partially reflected by the pallet, and detected by the non-image sensor. The percentage, portion, and location of the detected reflected emitted electromagnetic signal can be used to determine one or more of the pallet dimensions, topography, shape, profile, or geometry. The first set of pallet data can be obtained while the pallet is in motion.

The second set of pallet data can be sensed with sensors that obtain image data as the second set of pallet data. Similarly, the second set of pallet data can be obtained while the pallet is in motion.

More than one sensor can be used to obtain the first set of pallet data and the second set of pallet data. For example, the sensor 41d and the upper sensor 41h can provide an output that is combined to determine the first set of pallet data that is not image based, and the multiple cameras 41a, 41b, 41c, 41e, 41f, 41g can provide an output that is combined to determine the second set of pallet data that is image based.

At least part of the data gathered to define the first set of pallet data can be sensed using the mirror 77. That is, at least one of the non-image sensors used to sense the first set of pallet data is located such that the emitted electromagnetic signal is first reflected by the mirror 77. The reflected electromagnetic signal then strikes the pallet. At least a portion of the electromagnetic signal is then reflected by the pallet back to the mirror 77, which then reflect the at least a portion of the electromagnetic signal to the detector of the at least one non-image sensor.

At least part of the data gathered to define the second set of pallet data can be sensed using the mirror 77. At least one camera 41e of the multiple cameras 41a, 41b, 41c, 41e, 41f, 41g can obtain image data received as ambient or artificial light reflected off the pallet is reflected off the mirror 77 prior to detection by the at least one camera 41e.

Optionally, one or more of the first sensor 42, the sensor 41d, the upper sensor 41h, multiple cameras 41a, 41b, 41c, 41e, 41f, 41g can be activated by the controller module 150 or the logic module 152. The controller module 150 or the logic module 152 activation can be based on information or data provided by additional sensors (e.g., motion sensors). The first set of data and the second sect of data can be received by the logic module 152.

Optionally, at 409, the logic module 152 can process or otherwise format the first set of pallet data, resize or normalize the second set of pallet data, or a combination thereof. For example, the logic module 152 can receive image data and process, use regression, or other mathematical or analytical methods to resize or normalize the images or image data obtained by the multiple cameras 41a, 41b, 41c, 41e, 41f, 41g.

At 410, the logic module 152 selectively communicates a subset of pallet data to the machine learning module 154. The subset of data includes at least a portion of data from the first set of pallet data and the second set of pallet data. For example, the subset of pallet data can include all of the first set of pallet data and a portion of the second set of pallet data.

At 412, the machine learning module 154 determines a third set of pallet data based on the subset of pallet data. To determine the third set of pallet data, the machine learning module 154 can analyze the subset of the pallet data that includes image and non-image data. The machine learning module 154 can use image recognition algorithms and other image processing techniques to identify patterns and generate insights. The machine learning module 154 can use deep learning datasets to distinguish patterns in images, Convolutional Neural Networks (CNNs) to process visual data to learn patterns, textures, and high-level features for object detection and classification, image segmentation, multimodal embeddings where images are converted to coordinates in a multidimensional vector space prior to analysis, or any combination thereof.

At 414, the third set of pallet data is communicated from the machine learning module 154 to the logic module 152. At 416, the logic module 152 determines the conveyance path that corresponds to the pallet received at the first position based on the third set of pallet data.

At 418, the conveyance path is communicated from the logic module 152 to the controller module 150. At 420, the controller module 150 communicates with aspects of the pallet sorting system 10 to transport the pallet to a second position according to the communicated conveyance path. The friction brake assembly 111 ensures proper location of the pallet relative to the correct release assembly 18, 28, 30. The friction brake assembly 111 can include any number of sensors, such as, but not limited to, speed sensors or location sensors that increase or decrease the distance 115. That is, optionally, the friction brake assembly 111 can include real time control for the pallet and can adjust the doors 111a, 111b, 111c and the paddle 117.

Benefits of aspects of the disclosure include faster and more accurate sorting of a plurality of pallets. The control system can improve both the speed and accuracy with which the plurality of pallets are sorted.

The friction brake assembly provides a solution to a long-felt need in the industry to decrease cycle time. The friction brake assembly allows the pallets to move along the conveyor belts at higher speeds and accurately stop or decrease speed when desired. The friction brake assembly can decrease cycle time by at least 20%.

The control system provides delegation of tasks, where the controller module generally runs the physical movement of components of the pallet sorting system. The logic module gathers, processes, and communicates information with the user, the controller module, various sensors, and the machine learning module. The machine learning module processes data provided by the logic module. This delegation provides flexibility within the system where pre-existing pallet sorting systems with preexisting controller modules can be outfitted with a complementary logic module and machine learning module. Further, this configuration allows aspects of the machine learning module to be updated or changed without impacting the function of the logic module or the controller module.

The mirror allows for one or more cameras (image sensors) and other sensors (non-image sensors) to be located in a clearer environment that is not below the pallet. This can extend the life of the cameras and sensors, as debris from the pallet will not be deposited directly on the cameras and sensors.

The sensor has an increasing width or field of view as the emitted signal moves away from the sensor. The sensor must be located a predetermined distance from the object desired to be sensed (pallet), which often requires digging into concrete floors to be able to mount the sensor below the object (pallet). However, the mirror provides the benefit that no major reconfiguration of the floor, building, or ground is required. The mirror, using reflection, allows the sensor to be located the desired predetermined distance by using the distance from the sensor to the mirror and the distance from the mirror to the object to obtain the desired predetermined distance.

The clearing device for the mirror provides a benefit of clearing debris. While illustrated as automatic, the clearing device can be supplemented by additional manual clearing of the mirror. Additionally, the frequency of the activation of the clearing device can be adjusted. Further, sensors can provide additional feedback that can active the clearing device.

Another benefit is the loading sensor that provides a signal indicative of the presence of at least a portion of the pallet that is not within the interior of the loading assembly. This prevents the lifters from lifting a pallet that isn't completely in the elevator. When a pallet is not completely within the elevator and it is lifted, the pallet can be damaged. The loading sensor reduces damage to the pallet while the pallet is lifted to the overhead conveyor.

Further aspects are provided by the subject matter of the following clauses:

A method for conveying a pallet through a pallet sorting system, the method comprising receiving a pallet at a first position of a feeder, a loading assembly, or a conveyor system, at least partially locating the pallet within a tunnel scanner assembly having first sensors, a mirror, and image sensors, sensing from the first sensors a first set of pallet data, wherein the first set of pallet data is non-image data, and wherein at least one first sensor of the first sensors senses data by emitting an electromagnetic signal that is reflected by a mirror to the pallet, wherein the pallet reflects at least a portion of the emitted electromagnetic signal, and detecting the at least a portion of the emitted electromagnetic signal reflected off the pallet via the mirror, sensing, by the image sensors, a second set of pallet data, wherein at least one image sensor of the image sensors detects light reflected from the pallet via a mirror, receiving, at a logic module the first set of pallet data and the second set of pallet data, selectively communicating a subset of pallet data to the logic module to a machine learning module, the subset of pallet data comprising the first set of pallet data or a subset of the first set of pallet data, and the second set of pallet data or a subset of the second set of pallet data, determining a third set of pallet data at the machine learning module based on the subset of pallet data, communicating the third set of pallet data from the machine learning module to the logic module, determining, at the logic module, a conveyance path based at least on the third set of pallet data, communicating the conveyance path from the logic module to a controller module, and transporting the pallet along the conveyance path to a second position via the conveyor system in communication with the controller module.

The method of any preceding clause, wherein the pallet is a first pallet and the method further comprises, receiving a second pallet at the first position after the communicating the conveyance path of the first pallet is complete.

The method of any preceding clause, wherein the transporting the pallet along the conveyance path further comprises reducing pallet speed with a friction brake assembly.

The method of any preceding clause, wherein the reducing the pallet speed with the friction brake assembly includes adjusting doors, adjusting a paddle, or combination thereof.

The method of any preceding clause, wherein the transporting the pallet along the conveyance path to the second position is complete in less than 4.5 seconds.

The method of any preceding clause, wherein the transporting the pallet along the conveyance path includes conveying the pallet to a repair station.

The method of any preceding clause, wherein the first set of pallet data, the second set of pallet data, the third set of pallet data, or any combination thereof is used to determine a maintenance list provided to the repair station or a screen.

The method of any preceding clause, wherein the transporting the pallet along the conveyance path includes conveying the pallet to the tunnel scanner assembly after the conveying the pallet to the repair station.

The method of any preceding clause, wherein the transporting the pallet along the conveyance path includes, after the tunnel scanner assembly, conveying the pallet to one of a receiving portion, a side conveyor, the loading assembly, or a refuse area based on post repair data obtained by the tunnel scanner assembly.

The method of any preceding clause, wherein the first set of pallet data includes at least one of a length or a width of the pallet and wherein the at least one of the length or the width of the pallet is indicative of pallet origin.

The method of any preceding clause, wherein the first set of pallet data includes a two-dimensional or three-dimensional topography of the pallet.

The method of any preceding clause, further comprising activating a clearing device at a predetermined frequency or upon determination that the mirror is unclean.

The method of any preceding clause, wherein the activating the clearing device includes fluidly coupling, via at least one valve, a compressed air source and a knife blower.

A method for conveying a pallet through a pallet sorting system, the method comprising: receiving a pallet at a first position of a feeder, a loading assembly, or a conveyor system, sensing from at least a first sensor a first set of pallet data, sensing from at least a second sensor a second set of pallet data, wherein the second sensor is an optical sensor, receiving, at a controller module, a logic module, or a combination thereof, the first set of pallet data and the second set of pallet data, selectively communicating a subset of pallet data from the first set of pallet data, the second set of pallet data, or a combination thereof from the logic module to a machine learning module, determining a third set of pallet data at the machine learning module based on the subset of pallet data, communicating the third set of pallet data from the machine learning module to the logic module, determining, at the logic module, a conveyance path based at least on the third set of pallet data, communicating the conveyance path from the logic module to the controller module, and transporting the pallet along the conveyance path to a second position via the conveyor system in communication with the controller module.

The method of any preceding clause, wherein the pallet is a first pallet and the method further comprises, receiving a second pallet at the first position after the communicating the conveyance path of the first pallet is complete.

The method of any preceding clause, wherein the first sensor and the second sensor are spaced along a feeder operably coupled to the loading assembly.

The method of any preceding clause, wherein the pallet is a first pallet and the method further comprises, receiving a second pallet at the first position of the feeder after the conveyance path is communicated to the controller module.

The method of any preceding clause, further comprising, prior to the receiving the pallet at the first position, determining a sorting configuration for the pallet sorting system based on an origin or type of pallets to be received by the pallet sorting system.

The method of any preceding clause, wherein the subset of pallet data from the first set of pallet data, the second set of pallet data, or combination thereof from the logic module sent to the machine learning module is based, at least in part, on the sorting configuration of the logic module.

The method of any preceding clause, wherein the determining the sorting configuration is based on a conveyor system layout and a pallet population.

The method of any preceding clause, wherein the second sensor is multiple cameras located within a tunnel.

The method of any preceding clause, wherein the controller module operably controls the multiple cameras to obtain the second set of pallet data as the pallet is located within the tunnel or travels through the tunnel.

The method of any preceding clause, wherein the logic module is configured to resize or normalize the second set of pallet data prior to the communicating the subset of pallet data with the machine learning module.

The method of any preceding clause, wherein the first set of pallet data includes at least one of a length or a width of the pallet and wherein the at least one of the length or the width of the pallet is indicative of pallet origin.

The method of any preceding clause, wherein the first sensor is a photoelectric sensor.

The method of any preceding clause, wherein the third set of pallet data includes at least one of a color data, a grade, or a discontinuity rank.

A method for conveying a pallet through a pallet sorting system, the method comprising receiving a pallet at a first position of the pallet sorting system, obtaining, by one or more cameras, a first set of pallet data, wherein the obtaining is operably controlled by a controller module or a logic module, selectively communicating a subset of pallet data of the first set of pallet data from the logic module to a machine learning module, determining a second set of pallet data at the machine learning module based at least on the subset of pallet data, communicating the second set of pallet data from the machine learning module to the logic module, determining, at the logic module, a conveyance path based at least on the second set of pallet data, communicating the conveyance path from the logic module to the controller module; and transporting the pallet along the conveyance path to a second position via a conveyor system in communication with the controller module based on the determined conveyance path.

The method of any preceding clause, wherein the first set of pallet data is a set of image data and the determining the second set of pallet data at the machine learning module includes providing the image data to a first model and a second model, the first model configured to provide color data, and the second model configured to provide block data, wherein the second set of pallet data includes at least a pallet grade of the pallet based on the color data and the block data.

The method of any preceding clause, wherein the color data includes one of red, blue, green, white, or other and wherein the color data is received at the second model to determine the block data.

The method of any preceding clause, wherein the pallet sorting system includes an overhead conveyor system, a loading assembly, and a stacking assembly located below the overhead conveyor system, and wherein the transporting the pallet along the conveyance path to the second position includes selectively releasing the pallet from the overhead conveyor system into the stacking assembly by a release assembly.

The method of any preceding clause, wherein the one or more cameras are located at the loading assembly or the overhead conveyor system.

The method of any preceding clause, wherein the pallet is a first pallet and the method further comprises, receiving a second pallet at the first position of the pallet sorting system after the determining the conveyance path of the first pallet is complete.

The method of any preceding clause, wherein the logic module is configured to resize or normalize the first set of pallet data prior to the communicating the subset of pallet data with the machine learning module.

The method of any preceding clause, wherein the delivering of the pallet further includes an inspection system having a camera, a photo eye sensor, a limit switch, a dimensional sensor, a tunnel scanner equipped with multiple sensors, or a user having a push button actuated by the user, wherein an output of the inspection system determines the stacking assembly that will receive the pallet.

The method of any preceding clause, wherein the adjusting the vertical height of the movable floor includes a lowering of the movable floor by the height adjustment mechanism.

A method of selectively sorting a plurality of pallets using the pallet sorting system of claim 1, the method comprising: receiving, at a leading edge of the overhead conveyor system, at least one pallet of the plurality of pallets; translating the at least one pallet onto the conveyor platform via a finger of the push rail; delivering the pallet via the corresponding release assembly to a predetermined stacking assembly; and adjusting a vertical height of the first movable floor upon delivering the pallet.

A pallet sorting system comprising a conveyance system comprising a receiving portion and a delivery portion, a tunnel scanner assembly located between the receiving portion and the delivery portion, wherein the tunnel scanner assembly includes a camera configured to obtain image data, a sensor configured to obtain non-image data, and a mirror, wherein light detected by the camera is received from the mirror, and wherein the mirror reflects an electromagnetic signal provided by the sensor, and a control system operably coupled to the conveyance system and the tunnel scanner assembly, the control system configured to receive the image data from the camera and the non-image data from the sensor, determine from the image data and the non-image data information related to a pallet located at least partially within the tunnel scanner assembly, provide a conveyance path for the pallet based on the information related to the pallet, and activate the conveyance system to transport the pallet along the conveyance path.

The pallet sorting system of any preceding clause, wherein the conveyance system further comprises a first belt and a second belt located at least partially within the tunnel scanner assembly and wherein at least a portion of the mirror is located at least one of between the first belt and the second belt or spatially below the first belt and the second belt.

The pallet sorting system of any preceding clause, wherein the delivery portion couples to a loading assembly to provide at least one pallet from a feeder to the loading assembly.

The pallet sorting system of any preceding clause, wherein the loading assembly couples to an overhead conveyor system having a push rail and a friction brake.

The pallet sorting system of any preceding clause, wherein a cycle time to move the pallet from a first position to a second position is less than 4.5 seconds.

The pallet sorting system of any preceding clause, wherein the cycle time is 3 to 4 seconds.

The pallet sorting system of any preceding clause, further comprising a clearing device.

A pallet sorting system comprising an overhead conveyor system having a conveyor platform and a push rail, a loading assembly configured to provide a pallet to the overhead conveyor system, a stacking assembly located below the conveyor platform, wherein the stacking assembly includes a first chute, a first movable floor, and a first height adjustment mechanism operably coupled to the first movable floor, and a release assembly coupled to a portion of the conveyor platform, wherein the release assembly includes a portion selectively configured to release a pallet into the first chute.

The pallet sorting system of any preceding clause, wherein the stacking assembly comprises a sensor in communication with the first height adjustment mechanism, wherein an output from the sensor is used to adjust a vertical height of the first movable floor.

The pallet sorting system of any preceding clause, wherein the vertical height of the first movable floor is automatically adjusted by the first height adjustment mechanism based on the output of the sensor.

The pallet sorting system of any preceding clause, wherein the stacking assembly further comprises a gate movable between an open position and a closed position.

The pallet sorting system of any preceding clause, wherein the stacking assembly further comprises an evacuation belt configured to move one or more pallets from stacking assembly to a conveyor when the gate is in the open position.

The pallet sorting system of any preceding clause, wherein the loading assembly comprises an elevator that receives a pallet from a feeder.

The pallet sorting system of any preceding clause, wherein the elevator comprises a pair of slats coupled to a vertical belt system that determines a vertical distance between the pair of slats and a base.

The pallet sorting system of any preceding clause, wherein the pair of slats are multiple pairs of slats that lift upward two or more pallets stacked vertically to be received sequentially by the overhead conveyor system.

The pallet sorting system of any preceding clause, wherein the push rail comprises a finger configured to move the pallet from the loading assembly to the conveyor platform when the elevator positions the pallet at the conveyor platform.

The pallet sorting system of any preceding clause, wherein the push rail comprises a plurality of fingers coupled to a belt system rotatably driven about a support body, wherein each finger of the plurality of fingers is configured to move a pallet from the loading assembly to the conveyor platform.

The pallet sorting system of any preceding clause, wherein the portion of the release assembly includes two surfaces rotatable between a first position and a second position, wherein the two surfaces in the first position are configured to define a portion of the conveyor platform and the two surfaces in the second position are configured to release the pallet to the first chute.

The pallet sorting system of any preceding clause, wherein motion of the two surfaces is controlled in part by pistons.

The pallet sorting system of any preceding clause, wherein the stacking assembly is a first stacking assembly and the pallet sorting system further comprises a second stacking assembly comprising a second chute, a second movable floor, and a second height adjustment mechanism operably coupled to the second movable floor.

The pallet sorting system of any preceding clause, wherein the release assembly is a first release assembly and the pallet sorting system further comprises a second release assembly, wherein the first release assembly includes a first portion selectively configured to release the pallet to the first chute and the second release assembly includes a second portion selectively configured to release the pallet to a second chute assembly.

The pallet sorting system of any preceding clause, further comprising an inspection system mounted to the overhead conveyor system, the loading assembly, or combination of thereof, wherein the inspection system comprises a camera, a photo eye sensor, a limit switch, a dimensional sensor, a tunnel scanner equipped with multiple sensors, or a user having a push button actuated by the user.

The pallet sorting system of any preceding clause, wherein movement of at least one of the first portion of the first release assembly or the second portion of the second release assembly is based on output from the inspection system.

The pallet sorting system of any preceding clause, further comprising an inspection system mounted to the overhead conveyor system, the loading assembly, or combination of thereof, wherein the inspection system comprises a camera, a photo eye sensor, a limit switch, a dimensional sensor, a tunnel scanner equipped with multiple sensors, or a user having a push button actuated by the user.

The pallet sorting system of any preceding clause, wherein the first movable floor includes at least one pair of platforms and the first height adjustment mechanism includes a belt coupled to the at least one pair of platforms.

The pallet sorting system of any preceding clause, wherein the stacking assembly includes a frame that defines an interior and an exterior of the stacking assembly, and wherein the belt is configured to lower the at least one pair of platforms downward when in the interior, and upward when the at least one pair of platforms are located exterior of the frame.

The pallet sorting system of any preceding clause, wherein the stacking assembly further comprises a gate movable between a closed position and an open position, and an evacuation belt configured to move one or more pallets from stacking assembly to a conveyor when the gate is in the open position.

To the extent not already described, the different features and structures of the various embodiments can be used in combination, or in substitution with each other as desired. That one feature is not illustrated in all of the embodiments is not meant to be construed that it cannot be so illustrated but is done for brevity of description. Thus, the various features of the different embodiments can be mixed and matched as desired to form new embodiments, whether or not the new embodiments are expressly described. All combinations or permutations of features described herein are covered by this disclosure.

This written description uses examples to describe aspects of the disclosure described herein, including the best mode, and also to enable any person skilled in the art to practice aspects of the disclosure, including making and using any devices or systems and performing any incorporated methods. The patentable scope of aspects of the disclosure is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

What is claimed is:

1. A method for conveying a pallet through a pallet sorting system, the method comprising:
  receiving a pallet at a first position of a feeder, a loading assembly, or a conveyor system;
  at least partially locating the pallet within a tunnel scanner assembly having first sensors, a mirror, and image sensors;
  sensing from the first sensors a first set of pallet data, wherein the first set of pallet data is non-image data, and wherein at least one first sensor of the first sensors senses data by:
    emitting an electromagnetic signal that is reflected by a mirror to the pallet, wherein the pallet reflects at least a portion of the emitted electromagnetic signal; and
    detecting the at least a portion of the emitted electromagnetic signal reflected off the pallet via the mirror;
  sensing, by the image sensors, a second set of pallet data, wherein at least one image sensor of the image sensors detects light reflected from the pallet via a mirror;
  receiving, at a logic module the first set of pallet data and the second set of pallet data;
  selectively communicating a subset of pallet data from the logic module to a machine learning module, the subset of pallet data comprising:
    the first set of pallet data or a subset of the first set of pallet data; and
    the second set of pallet data or a subset of the second set of pallet data;
  determining a third set of pallet data at the machine learning module based on the subset of pallet data;
  communicating the third set of pallet data from the machine learning module to the logic module;
  determining, at the logic module, a conveyance path based at least on the third set of pallet data;
  communicating the conveyance path from the logic module to a controller module; and
  transporting the pallet along the conveyance path to a second position via the conveyor system in communication with the controller module, wherein the transporting the pallet along the conveyance path includes conveying the pallet to a repair station and conveying the pallet to the tunnel scanner assembly or another tunnel scanner assembly after the conveying the pallet to the repair station.

2. The method of claim 1, wherein the pallet is a first pallet and the method further comprises, receiving a second pallet at the first position after the communicating the conveyance path of the first pallet is complete.

3. The method of claim 1, wherein the transporting the pallet along the conveyance path further comprises reducing pallet speed with a friction brake assembly.

4. The method of claim 3, wherein the reducing the pallet speed with the friction brake assembly includes adjusting doors, adjusting a paddle, or a combination thereof.

5. The method of claim 1, wherein the transporting the pallet along the conveyance path to the second position is complete in less than 4.5 seconds.

6. The method of claim 1, wherein the first set of pallet data, the second set of pallet data, the third set of pallet data, or any combination thereof is used to determine a maintenance list provided to the repair station or a screen.

7. The method of claim 1, wherein the transporting the pallet along the conveyance path includes, after the tunnel scanner assembly, conveying the pallet to one of a receiving portion, a side conveyor, the loading assembly, or a refuse area based on post repair data obtained by the tunnel scanner assembly.

8. The method of claim 1, wherein the first set of pallet data includes at least one of a length or a width of the pallet and wherein the at least one of the length or the width of the pallet is indicative of pallet origin.

9. The method of claim 1, wherein the first set of pallet data includes a two-dimensional or three-dimensional topography of the pallet.

10. The method of claim 1, further comprising activating a clearing device at a predetermined frequency or upon determination that the mirror is unclean.

11. A method for conveying a pallet through a pallet sorting system, the method comprising:
  receiving a pallet at a first position of a feeder, a loading assembly, or a conveyor system;
  at least partially locating the pallet within a tunnel scanner assembly having first sensors, a mirror, and image sensors;
  sensing from the first sensors a first set of pallet data, wherein the first set of pallet data is non-image data, and wherein at least one first sensor of the first sensors senses data by:
    emitting an electromagnetic signal that is reflected by a mirror to the pallet, wherein the pallet reflects at least a portion of the emitted electromagnetic signal; and
    detecting the at least a portion of the emitted electromagnetic signal reflected off the pallet via the mirror;
  sensing, by the image sensors, a second set of pallet data, wherein at least one image sensor of the image sensors detects light reflected from the pallet via a mirror;
  receiving, at a logic module the first set of pallet data and the second set of pallet data;
  selectively communicating a subset of pallet data from the logic module to a machine learning module, the subset of pallet data comprising:
    the first set of pallet data or a subset of the first set of pallet data; and
    the second set of pallet data or a subset of the second set of pallet data;
  determining a third set of pallet data at the machine learning module based on the subset of pallet data;
  communicating the third set of pallet data from the machine learning module to the logic module;
  determining, at the logic module, a conveyance path based at least on the third set of pallet data;
  communicating the conveyance path from the logic module to a controller module; and
  transporting the pallet along the conveyance path to a second position via the conveyor system in communication with the controller module; and
  activating a clearing device at a predetermined frequency or upon determination that the mirror is unclean.

12. The method of claim 11, wherein the transporting the pallet along the conveyance path includes conveying the pallet to a repair station.

13. The method of claim 12, wherein the transporting the pallet along the conveyance path includes conveying the pallet to the tunnel scanner assembly or another tunnel scanner assembly after the conveying the pallet to the repair station.

14. The method of claim 11, wherein the activating the clearing device includes fluidly coupling, via at least one valve, a compressed air source and a knife blower.

15. A pallet sorting system comprising:

a conveyance system comprising:

a receiving portion and a delivery portion, wherein the delivery portion couples to a loading assembly to provide at least one pallet from a feeder to the loading assembly and wherein the loading assembly couples to an overhead conveyor system having a push rail and a friction brake;

a tunnel scanner assembly located between the receiving portion and the delivery portion, wherein the tunnel scanner assembly includes:

a camera configured to obtain image data;

a sensor configured to obtain non-image data; and a mirror, wherein light detected by the camera is received from the mirror, and wherein the mirror reflects an electromagnetic signal provided by the sensor; and a control system operably coupled to the conveyance system and the tunnel scanner assembly, the control system configured to receive the image data from the camera and the non-image data from the sensor, determine from the image data and the non-image data information related to a pallet located at least partially within the tunnel scanner assembly, provide a conveyance path for the pallet based on the information related to the pallet, and activate the conveyance system to transport the pallet along the conveyance path.

16. The pallet sorting system of claim 15, wherein the conveyance system further comprises a first belt and a second belt located at least partially within the tunnel scanner assembly and wherein at least a portion of the mirror is located at least one of between the first belt and the second belt or spatially below the first belt and the second belt.

17. The pallet sorting system of claim 15, wherein a cycle time to move the pallet from a first position to a second position is less than 4.5 seconds.

18. The pallet sorting system of claim 17, wherein the cycle time is 3 to 4 seconds.

19. The pallet sorting system of claim 15, further comprising a clearing device.

* * * * *